US00RE48659E

(19) United States
(12) Reissued Patent
Sagata

(10) Patent Number: US RE48,659 E
(45) Date of Reissued Patent: Jul. 27, 2021

(54) NON-CONTACT CHARGING SYSTEM, NON-CONTACT CHARGING METHOD, NON-CONTACT CHARGING TYPE VEHICLE, AND NON-CONTACT CHARGING MANAGEMENT APPARATUS

(71) Applicant: TOYOTA JIDOSHA KABUSHIKI KAISHA, Toyota (JP)

(72) Inventor: Koji Sagata, Ichikawa (JP)

(73) Assignee: TOYOTA JIDOSHA KABUSHIKI KAISHA, Toyota (JP)

(21) Appl. No.: 15/821,582

(22) Filed: Nov. 22, 2017

Related U.S. Patent Documents

Reissue of:
(64) Patent No.: 9,197,093
Issued: Nov. 24, 2015
Appl. No.: 13/642,354
PCT Filed: Dec. 24, 2010
PCT No.: PCT/JP2010/073290
§ 371 (c)(1),
(2) Date: Oct. 19, 2012
PCT Pub. No.: WO2012/086048
PCT Pub. Date: Jun. 28, 2012

(51) Int. Cl.
*H02J 7/00* (2006.01)
*H01F 38/14* (2006.01)
(Continued)

(52) U.S. Cl.
CPC ..... *B60L 53/68* (2019.02); *B60L 3/12* (2013.01); *B60L 53/126* (2019.02); *B60L 53/30* (2019.02);
(Continued)

(58) Field of Classification Search
CPC ..... H02J 7/025; B60L 3/12; B60L 11/182; B60L 11/1824; B60L 11/1831; B60L 11/1833; B60L 11/1846
See application file for complete search history.

(56) References Cited

U.S. PATENT DOCUMENTS 3,938,018 A 2/1976 Dahl
4,800,328 A 1/1989 Bolger et al.
(Continued)

FOREIGN PATENT DOCUMENTS

AU 2006269374 A1 1/2007
AU 2007349874 A1 10/2008
(Continued)

OTHER PUBLICATIONS

Extended European Search Report dated Jan. 3, 2013, in European Patent Application No. 08842443.7.
(Continued)

*Primary Examiner* — Linh M Nguyen
(74) *Attorney, Agent, or Firm* — Oblon, McClelland, Maier & Neustadt, L.L.P.

(57) ABSTRACT

A charging apparatus assigns an area ID, which is information that the charging apparatus uses to determine the presence of a vehicle, to a charging area BS and transmits the assigned area ID. Based on return of the transmitted area ID from the vehicle 200, the charging apparatus establishes pairing, which is a communication connection setting, between the charging apparatus and the vehicle. The charging apparatus then performs electric power management of the electric power transmitted from the charging area BS to the vehicle in a non-contact manner through wireless communication between the paired vehicle and charging apparatus.

26 Claims, 9 Drawing Sheets

(51) Int. Cl.

| | |
|---|---|
| ***H02J 7/02*** | (2016.01) |
| ***B60L 53/68*** | (2019.01) |
| ***H02J 50/80*** | (2016.01) |
| ***H02J 50/90*** | (2016.01) |
| ***H02J 50/12*** | (2016.01) |
| ***H02J 50/40*** | (2016.01) |
| ***B60L 53/126*** | (2019.01) |
| ***B60L 53/36*** | (2019.01) |
| ***B60L 53/39*** | (2019.01) |
| ***B60L 53/30*** | (2019.01) |
| ***B60L 53/65*** | (2019.01) |
| ***B60L 3/12*** | (2006.01) |

(52) U.S. Cl.

CPC ..... *B60L 53/36* (2019.02); *B60L 53/39* (2019.02); *B60L 53/65* (2019.02); *H02J 7/025* (2013.01); *H02J 50/12* (2016.02); *H02J 50/40* (2016.02); *H02J 50/80* (2016.02); *H02J 50/90* (2016.02); *B60L 2210/30* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 30/14* (2013.01)

(56) References Cited

U.S. PATENT DOCUMENTS

| | | | | |
|---|---|---|---|---|
| 5,461,297 | A | 10/1995 | Crawford | |
| 5,703,461 | A | 12/1997 | Minoshima et al. | |
| 5,795,849 | A | 8/1998 | Hickman | |
| 5,821,731 | A | 10/1998 | Kuki et al. | |
| 5,850,135 | A | 12/1998 | Kuki et al. | |
| 5,898,575 | A | 4/1999 | Hawthorne et al. | |
| 5,898,579 | A | 4/1999 | Boys et al. | |
| 5,926,004 | A | 7/1999 | Henze | |
| 6,100,663 | A | 8/2000 | Boys et al. | |
| 6,104,169 | A | 8/2000 | Radys et al. | |
| 6,239,577 | B1 * | 5/2001 | Koike et al. | 320/108 |
| 6,389,318 | B1 | 5/2002 | Zarinetchi et al. | |
| 6,396,241 | B1 | 5/2002 | Ramos et al. | |
| 6,525,510 | B1 | 2/2003 | Ayano et al. | |
| 7,737,861 | B2 * | 6/2010 | Lea et al. | 340/8.1 |
| 8,008,888 | B2 | 8/2011 | Oyobe et al. | |
| 8,975,864 | B2 * | 3/2015 | Kim | B60L 11/182 320/109 |
| 2004/0142733 | A1 | 7/2004 | Parise | |
| 2005/0068019 | A1 | 3/2005 | Nakamura et al. | |
| 2006/0076922 | A1 | 4/2006 | Cheng et al. | |
| 2006/0181242 | A1 | 8/2006 | Freed et al. | |
| 2006/0284593 | A1 * | 12/2006 | Nagy et al. | 320/109 |
| 2007/0046460 | A1 * | 3/2007 | Aljadeff | H04W 64/00 340/539.13 |
| 2007/0121575 | A1 | 5/2007 | Savry et al. | |
| 2007/0139000 | A1 | 6/2007 | Kozuma et al. | |
| 2007/0222542 | A1 | 9/2007 | Joannopoulos et al. | |
| 2007/0247005 | A1 | 10/2007 | Tetlow | |
| 2008/0197802 | A1 | 8/2008 | Onishi et al. | |
| 2008/0238364 | A1 | 10/2008 | Weber et al. | |
| 2008/0252254 | A1 | 10/2008 | Osada | |
| 2008/0278264 | A1 | 11/2008 | Karalis et al. | |
| 2009/0001929 | A1 | 1/2009 | Posamentier | |
| 2009/0195332 | A1 | 8/2009 | Joannopoulos et al. | |
| 2009/0195333 | A1 | 8/2009 | Joannopoulos et al. | |
| 2009/0224856 | A1 | 9/2009 | Karalis et al. | |
| 2009/0267709 | A1 | 10/2009 | Joannopoulos et al. | |
| 2009/0267710 | A1 | 10/2009 | Joannopoulos et al. | |
| 2010/0117596 | A1 | 5/2010 | Cook et al. | |
| 2010/0141203 | A1 | 6/2010 | Graziano et al. | |
| 2010/0225271 | A1 | 9/2010 | Oyobe et al. | |
| 2011/0057612 | A1 * | 3/2011 | Taguchi | H04Q 9/00 320/109 |
| 2012/0201054 | A1 * | 8/2012 | Kitamura | H02J 7/025 363/17 |

FOREIGN PATENT DOCUMENTS

| | | | |
|---|---|---|---|
| AU | 2010200044 | A1 | 1/2010 |
| CA | 2615123 | | 1/2007 |
| CA | 2682284 | | 10/2008 |
| CN | 101258658 | A | 9/2008 |
| CN | 101682216 | A | 3/2010 |
| CN | 101835653 | A | 9/2010 |
| EP | 0 788 212 | | 8/1997 |
| EP | 1902505 | | 3/2008 |
| EP | 2130287 | | 12/2009 |
| IN | 735/DELNP/2008 | | 5/2008 |
| IN | 6195/DELNP/2009 | | 7/2010 |
| JP | H05-245217 | A | 9/1993 |
| JP | H06-245326 | A | 9/1994 |
| JP | H07-227007 | A | 8/1995 |
| JP | 8-126106 | A | 5/1996 |
| JP | 08-126120 | A | 5/1996 |
| JP | 8 237890 | | 9/1996 |
| JP | H08-512454 | A | 12/1996 |
| JP | H09-65502 | A | 3/1997 |
| JP | H09-215211 | A | 8/1997 |
| JP | H10-136588 | A | 5/1998 |
| JP | 2000-509955 | A | 8/2000 |
| JP | 2001-8380 | A | 1/2001 |
| JP | 2001-177916 | A | 6/2001 |
| JP | 2002-152996 | A | 5/2002 |
| JP | 2003-143711 | A | 5/2003 |
| JP | 2003-224937 | A | 8/2003 |
| JP | 2004-72832 | A | 3/2004 |
| JP | 2004-203178 | A | 7/2004 |
| JP | 2005-27400 | A | 1/2005 |
| JP | 2005-102378 | A | 4/2005 |
| JP | 2005-110412 | A | 4/2005 |
| JP | 2006 74868 | | 3/2006 |
| JP | 2006-174676 | A | 6/2006 |
| JP | 2008 288889 | | 11/2008 |
| JP | 2009-501510 | A | 1/2009 |
| JP | 2009 106136 | | 5/2009 |
| JP | 2009 213295 | | 9/2009 |
| JP | 2010 193657 | | 9/2010 |
| KR | 2008-0031398 | A | 4/2008 |
| KR | 2010-0015954 | A | 2/2010 |
| RU | 2297928 | C1 | 4/2007 |
| WO | WO 97/42695 | A1 | 11/1997 |
| WO | 2006/127185 | A2 | 11/2006 |
| WO | 2007/008646 | A2 | 1/2007 |
| WO | 2008/032746 | A1 | 3/2008 |
| WO | 2008/118178 | A1 | 10/2008 |
| WO | 2009 054221 | | 4/2009 |

OTHER PUBLICATIONS

Extended European Search Report dated Jan. 16, 2013, in European Patent Application No. 08842443.7.

Andre Kurs, et al., "Wireless Power Transfer via Strongly Couple Magnetic Resonances", Science, American Association for the Advancement of Science, vol. 317, XP-002609542, 1 front page, pp. 83-86.

Chinese Office Action dated Dec. 10, 2014, in China Patent Application No. 201080067780.1.

International Search Report dated Apr. 5, 2011 in PCT/JP10173290 Filed Dec. 24, 2010.

"Finally, Power Supply Also Goes Wireless," Nikkei Electronics, Mar. 26, 2007, and a partial English translation.

* cited by examiner

Fig.2
| Charging Area | ID Information |
|---|---|
| Charging Area BS1 | Area ID1 |
| Charging Area BS2 | Area ID2 |
| Charging Area BS3 | Area ID3 |
| Charging Area BS4 | Area ID4 |
| Charging Area BS5 | Area ID5 |
| Charging Area BS6 | Area ID6 |
| • | • |
| • | • |
| Charging Area BSn | Area IDn |
Fig.3(a)
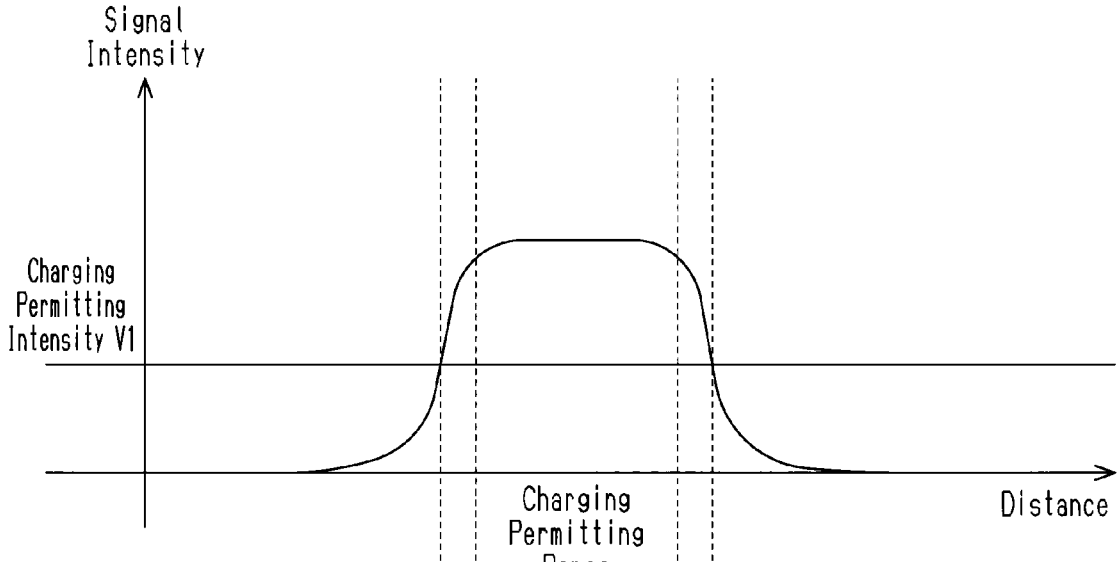
Fig.3(b)
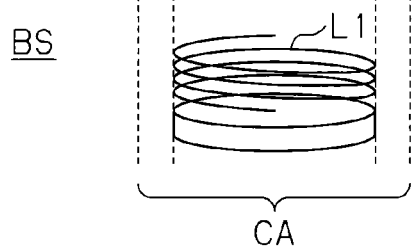

Fig.4

| | Accompanying Information | |
|---|---|---|
| ID Type | Vehicle Type | Charging Condition |
| ID1 | Vehicle Type 1 | Charging Condition 1 |
| ID2 | Vehicle Type 2 | Charging Condition 2 |
| ID3 | Vehicle Type 3 | Charging Condition 3 |
| ID4 | Vehicle Type 4 | Charging Condition 4 |
| • | • | • |
| • | • | • |
| • | • | • |
| IDn | Vehicle Type n | Charging Condition n |

Fig.9

| ID Type | Vehicle Type | Accompanying Information | | |
|---|---|---|---|---|
| ID1 | Vehicle Type 1 | Charging Condition 1 | User's Name | Billing State |
| ID2 | Vehicle Type 2 | Charging Condition 2 | • | |
| ID3 | Vehicle Type 3 | Charging Condition 3 | • | • |
| ID4 | Vehicle Type 4 | Charging Condition 4 | • | • |
| ID5 | Vehicle Type 5 | Charging Condition 5 | • | • |
| ID6 | Vehicle Type 6 | Charging Condition 6 | • | • |
| ID7 | Vehicle Type 7 | Charging Condition 7 | • | • |
| ID8 | Vehicle Type 8 | Charging Condition 8 | • | • |

Fig.10(Prior Art)

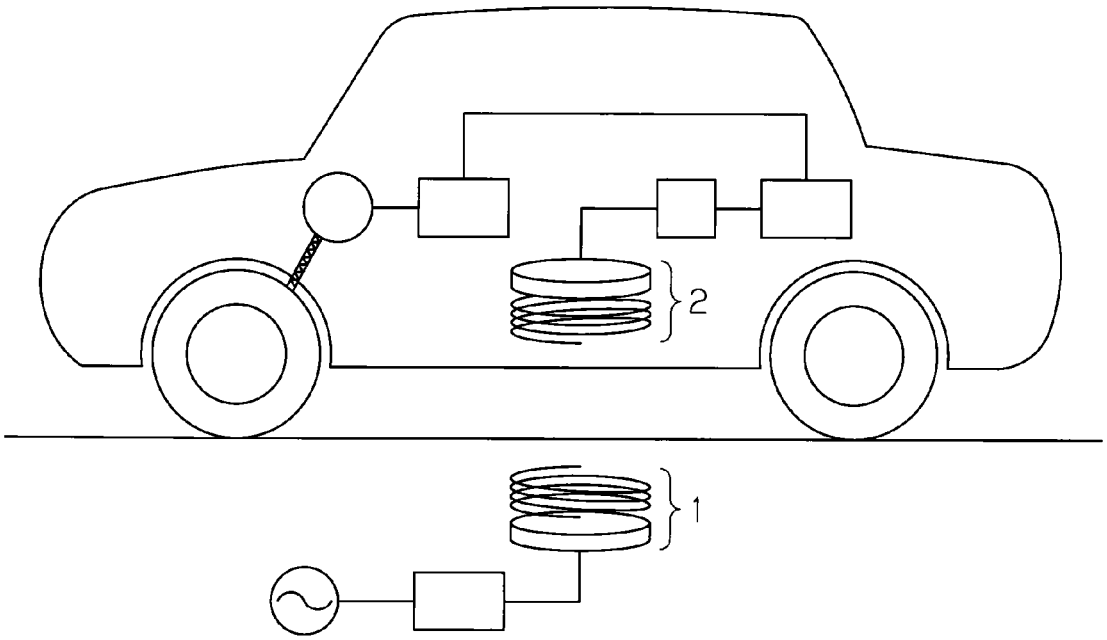

NON-CONTACT CHARGING SYSTEM, NON-CONTACT CHARGING METHOD, NON-CONTACT CHARGING TYPE VEHICLE, AND NON-CONTACT CHARGING MANAGEMENT APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*The present application is an application for reissue of U.S. Pat. No. 9,197,093, issued Nov. 24, 2015, which is a national stage application of PCT/JP2010/073290, filed Dec. 24 2010.*

FIELD OF THE DISCLOSURE

The present invention relates to a non-contact charging system, a non-contact charging method, a non-contact charging type vehicle, and a non-contact charging management apparatus.

BACKGROUND OF THE DISCLOSURE

Recent electric vehicles and hybrid vehicles employ a storage battery serving as an electric power supply unit for an electric motor, which is a drive source for such vehicles. As a system for recharging such a storage battery, a charging system having a charging device for supplying electric power to the storage battery, such as a charging station, has been proposed. Specifically, to recharge the storage battery using the system, a feeding plug, which is attached to a distal end of an electric power supply cable extending from the charging device, is inserted into a feeding port formed in the vehicle. This electrically connects the feeding plug to the storage battery in the vehicle. The storage battery is thus recharged by supplying electric power from the charging device to the storage battery through the electric power supply cable.

In contrast, a non-contact charging system has been proposed as a system for supplying electric power from a charging device to a storage battery without using the aforementioned electric power supply cable. Referring to FIG. 10, as described in Patent Document 1,for example, the non-contact charging system includes a charging device having an electric power transmission coil 1, which is embedded in the ground surface in advance. An electric power reception coil 2 is mounted in a lower body portion of a vehicle, which is a charging target. The electric power reception coil 2 is positioned to face the electric power transmission coil 1 to cause electric power transmission from the electric power transmission coil 1 to the electric power reception coil 2 through mutual induction or resonance brought about by electromagnetic coupling between the electric power transmission coil 1 and the electric power reception coil 2. Also, to control the electric power transmitted from the charging device to the storage battery, the non-contact charging system performs wireless communication between a charging-side wireless communication device, which is installed in the charging device, and an in-vehicle wireless communication device, which is mounted in the vehicle. However, when the wireless communication is carried out between the two wireless communication devices at a position close to the electric power transmission coil 1 and the electric power reception coil 2, the communication is influenced to a measurable extent by noise caused by a magnetic field produced between the electric power transmission coil 1 and the electric power reception coil 2. To solve this problem, typically in such non-contact charging systems, the two wireless communication devices are arranged at such positions that the wireless communication devices are prevented from being influenced by the magnetic field between the coils 1, 2, thus performing remote communication. To carry out wireless communication, pairing is carried out to ensure that the vehicle having the storage battery that is the charging target for the charging device corresponds to the vehicle that is the target for the wireless communication.

In the above-described charging system, the charging device may be used by an indefinite number of vehicles for recharging. In this case, an electric power transmission coil is embedded in each of a plurality of charging areas and the vehicles, which are the charging targets, are arranged in the respective charging areas. Also in this case, remote communication is carried out between the charging device and each of the vehicles. However, the charging device receives multiple wireless signals from the vehicles, which are, specifically, the corresponding in-vehicle wireless communication devices of the vehicles. This decreases accuracy in the aforementioned pairing.

To solve this problem, as described in Patent Document 2, a non-contact charging system has an electric power transmission device, which obtains identification information (ID information) from a portable device (a device to be recharged) as a charging target. Based on the obtained ID, the electric power transmission device authenticates the portable device as the charging target. Referring to FIG. 11, this non-contact charging system includes a plurality of electric power feeding devices 12, which have near field communication function and non-contact charging function for a portable device 20. Each of the electric power feeding devices 12 detects electromagnetic waves transmitted from the portable device 20, which is carried by the user, as an ID signal specific to the portable device 20. The electric power feeding device 12 then provides intensity information of the detected electromagnetic wave to a server device 16. The server device 16 has database storing IDs of different portable devices 20, which have been registered in advance. Specifically, based on a set of intensity information regarding the ID signals received by the electric power feeding devices 12, the server device 16 identifies the electric power feeding device 12 that corresponds to the most intense electromagnetic wave as the electric power feeding point for recharging the portable device 20. Subsequently, for the identified electric power feeding device 12, a monitor 14 serving as a display device arranged in parallel with the electric power feeding device 12 displays that the electric power feeding device 12 is now capable of charging. Then, based on comparison between the ID of the portable device 20 obtained by the identified electric power feeding device 12 and the corresponding ID registered in the database, the server device 16 authenticates the portable device 20 and sets a charging condition for the portable device 20 through the identified electric power feeding device 12. In this manner, the electric power feeding device 12 is caused to perform non-contact charging on the portable device 20.

PRIOR ART DOCUMENT

Patent Document

Patent Document 1: Japanese Laid-Open Patent Publication No. 2009-106136

Patent Document 2: Japanese Laid-Open Patent Publication No. 2009-213295

SUMMARY OF THE INVENTION

Problems That the Invention is to Solve

As has been described, when there are a plurality of electric power feeding devices, one of the electric power feeding device is set as an electric power feeding point, which is to feed electric power to a portable device serving as a charging target, based on intensities of electromagnetic waves transmitted by the portable device. The portable device is then authenticated using its ID. However, if there is a plurality of portable devices for a single electric power feeding point, the above-described pairing is difficult to establish. Specifically, when electromagnetic waves produced by the portable devices in the vicinity of the electric power feeding point (which is an electric power feeding device) have mutually overlapped communication ranges, it is difficult to identify one portable device as the charging target out of the portable devices located in the overlapped communication ranges.

Also, when a portable device is authenticated as a charging target using an ID specific to this portable device, only devices each having an ID registered in server database in advance can be candidates for the charging target. Additionally, a server must manage a great number of IDs belonging to portable devices owned by an indefinite number of users, which are different from one portable device to another. This inevitably complicates authentication of a charging target device using an ID and pairing prior to non-contact charging.

Accordingly, it is an objective of the present invention to provide a non-contact charging system, a non-contact charging method, a non-contact charging type vehicle, and a non-contact charging management apparatus that allow easy and accurate identification of a charging target device, including a vehicle such as an automobile or a portable device, and perform non-contact charging on the charging target device.

Means for Solving the Problems

To achieve the foregoing objective, a non-contact charging system includes a charging target device having a storage battery and a charging apparatus having intercommunication function for intercommunicating with the charging target device. The system transmits electric power to the corresponding charging target device in a non-contact manner to recharge the storage battery. The charging apparatus assigns an area ID serving as information for determining the presence of the charging target device to a charging area and transmits the area ID. The charging apparatus identifies the charging target device as a target of the electric power transmission based on return of the transmitted area ID from the charging target device through the intercommunication function. The charging apparatus transmits the electric power to the identified charging target device in a non-contact manner.

In the above-described configuration, the area ID used by the charging apparatus to determine the presence of the charging target device is assigned to each charging area of the charging apparatus. The charging apparatus transmits the assigned area ID to the charging target device. When the charging target device returns the transmitted area ID to the charging apparatus, the charging apparatus determines that the charging target device, which is the transmission source of the area ID, is the device located in the charging area, or, in other words, the device as the electric power transmission target. Accordingly, simply by assigning the area IDs to the respective charging areas and receiving the corresponding one of the area IDs returned from the charging target device, the charging apparatus is allowed to identify the charging target device. This allows the charging apparatus to identify the device as the charging target without obtaining an ID or information specific to the charging target device from the charging target device. Also, since the number of the assigned area IDs corresponds to the number of the charging areas, the charging apparatus is allowed to identify the charging target device using a minimum necessary number of IDs. This facilitates management of the area IDs. As a result, the charging apparatus identifies the charging target device easily and accurately, thus enabling non-contact charging for the charging target device.

In accordance with one aspect of the present invention, as first communication using the intercommunication function, pairing as communication connection setting between the identified charging target device and the charging apparatus is performed through transmission of the area ID between the charging apparatus and the charging target device through near field communication. As second communication through the intercommunication function, electric power control is performed on the electric power transmitted from the charging area to the charging target device in a non-contact manner through wireless communication different from the near field communication between the paired charging target device and charging apparatus.

In the above-described configuration, pairing is performed between the charging apparatus and the charging target device prior to the electric power control, based on transmission of the area ID between the charging apparatus and the charging target device. Then, wireless communication for the electric power control is carried out between the paired charging target device and charging apparatus. Accordingly, even when there is an indefinite number of charging target devices in the vicinity of the charging apparatus and the devices have mutually overlapped communication ranges for the second communication, the charging apparatus is allowed to accurately identify the charging target, with which the charging apparatus is to wirelessly communicate. In this manner, through a simple procedure including transmission and return of the area ID, the aforementioned pairing is established easily and accurately. This ensures accurate execution of the electric power control based on the second communication between the paired charging apparatus and charging target device. Also, a series of operation from communication to electric power transmission between the charging apparatus and the charging target device is accomplished in a non-contact manner without physically connecting the charging apparatus to the charging target device, for example.

In accordance with one aspect of the present invention, the charging apparatus has a plurality of charging areas one of which is said charging area, assigns an area ID to each of the charging areas, and separately transmits the assigned area IDs. When the charging target device returns the corresponding one of the transmitted area IDs to the charging apparatus, the charging apparatus identifies the charging area and the charging target device each as the electric power transmission target based on the returned area ID, and transmits the electric power from the identified charging area to the identified charging target device in a non-contact manner.

The present invention is effectively used particularly in a case in which there are a plurality of charging areas and a plurality of charging target devices, as in the above-described configuration. Specifically, in the above-described configuration, the charging target devices in the charging areas are identified through transmission and return of the area IDs, which have been assigned to the respective charging areas by the charging apparatus. This allows the charging apparatus to accurately identify each of the charging target devices arranged in the corresponding one of the charging areas. As a result, non-contact charging is performed accurately on the identified one of the charging target devices.

In accordance with one aspect of the present invention, the charging target device adds a device ID, which is specific information for identifying the charging target device, to the area ID provided by the charging apparatus, and returns the device ID and the area ID to the charging apparatus. The charging apparatus identifies the charging target device as the electric power transmission target including accompanying information of the charging target device based on the device ID returned from the charging target device together with the area ID.

In the above-described configuration, the charging apparatus receives the device ID, together with the area ID, from the charging target device. Using the area ID and the device ID, the charging apparatus identifies the charging target device as the electric power transmission target, including the accompanying information belonging to the charging target device. This allows the charging apparatus to obtain the accompanying information of the charging target device including the type and the specifications of the device and the device owner's name, in addition to identification of the charging target device to be recharged. As a result, the charging apparatus is allowed to recharge the charging target device using the accompanying information. This allows the charging apparatus to carry out electric power settings suitable for the type of the charging target device and bill the owner of the charging target device.

In accordance with one aspect of the present invention, the device ID includes specification information representing the specifications of the charging target device corresponding to the electric power transmission target. The charging apparatus determines the specifications of the charging target device as the electric power transmission target based on the specification information included in the device ID, and sets an electric power corresponding to the determined specifications as an electric power to be transmitted to the charging target device.

The specifications of the charging target devices are varied from one device type to another. It is thus desirable to set the value or amount of the electric power to be transmitted from the charging apparatus to each charging target device in a non-contact manner in correspondence with the specifications. Accordingly, in the above-described configuration, the charging target device returns the area ID that has been transmitted by the charging apparatus and the device ID including the specification information of the charging target device to the charging apparatus. This allows the charging apparatus to identify the charging target device as the charging target and the specifications of the charging target device. As a result, the charging apparatus is allowed to transmit the electric power corresponding to the specifications of each charging target device, thus properly recharging the charging target device in correspondence with the specifications of the charging target device.

In accordance with one aspect of the present invention, the charging apparatus has a primary coil for electric power transmission in correspondence with the charging area. The charging target device includes a secondary coil electromagnetically coupled to the primary coil. The electric power transmission from the charging area to the charging target device is carried out through electromagnetic induction or electromagnetic field resonance between the primary coil and the secondary coil.

In the above-described configuration, the charging apparatus performs electric power transmission from the charging area to the charging target device through electromagnetic induction or electromagnetic field resonance between the primary coil and the secondary coil. This allows the charging apparatus to accomplish non-contact charging on the charging target apparatus simply by arranging the primary and secondary coils to face each other. As a result, the non-contact charging is performed on the identified charging target device further easily.

In accordance with one aspect of the present invention, the charging apparatus transmits the area ID to the charging target device using electromagnetic coupling between the primary coil and the secondary coil. The charging target device guides the user of the charging target device to the charging area based on the intensity of a signal communicated between the primary coil and the secondary coil.

In the above-described configuration, the charging apparatus is allowed to transmit the area ID to the charging target device through a method of, for example, pulse modulation, amplitude modulation, or frequency modulation, by using electromagnetic coupling between the primary coil and the secondary coil. The intensity of the magnetic field of each of the primary and secondary coils characteristically increases locally about the position at which the coils face each other. The magnetic field of each coil is thus maintained in an extremely narrow range. Accordingly, the communication range brought about by the electromagnetic coupling between the primary and secondary coils is limited to a range in the vicinity of the coils. As a result, even when a secondary coil mounted in a certain charging target device is arranged to face the primary coil arranged in the corresponding charging area, and another charging target device having a secondary coil is located adjacent to the aforementioned charging target device, electromagnetic coupling occurs only between the primary coil and the secondary coil facing each other. In other words, the primary coil is electromagnetically coupled only to the secondary coil arranged in the charging area to face the primary coil but not to the secondary coil of the adjacently arranged charging target device. Specifically, even if there are a plurality of charging target devices each having a secondary coil in the vicinity of a certain charging area, the communication ranges of the secondary coils are prevented from being overlapped with one another. The charging apparatus is thus allowed to transmit only the area ID corresponding to the electric power transmission target to the charging target device located in the corresponding charging area. As a result, the charging apparatus reliably transmits the area ID for identifying the charging target device only to the charging target device to be identified. Also, the primary coil for electric power transmission is mounted typically in the corresponding charging area. As a result, based on the fact that intercommunication is established by electromagnetic coupling between the secondary coil and the primary coil, the charging apparatus is allowed to easily determine that the transmission source of the area ID that has been returned through the aforementioned intercommunication is located in the charging area.

Additionally, in the above-described configuration, the charging target device is guided to the charging area using the intensity of the signal communicated between the primary coil and the secondary coil. The charging target device is thus guided accurately to the charging area, which is the position where the charging target device faces the primary coil. This ensures not only establishment of intercommunication through the aforementioned electromagnetic coupling but also electric power transmission from the charging apparatus to the charging target device via the primary and secondary coils at the prescribed charging position. As a result, electric power is transmitted with improved efficiency.

In accordance with one aspect of the present invention, the charging target device is an electric vehicle or a hybrid vehicle including the storage battery serving as an electric power source for an electric motor. The charging apparatus includes a charging station for transmitting the electric power from the charging area to the storage battery of the electric vehicle or the hybrid vehicle.

Charging stations for electric or hybrid vehicles are expected to be used by an indefinite number of vehicles, identifying a charging target is thus particularly important for such charging stations. Specifically, to recharge an electric or hybrid vehicle in a non-contact manner, a charging station must identify a vehicle as a charging target out of other vehicles before transmitting electric power to the vehicle. In the above-described configuration, the charging station accurately identifies the vehicle as the charging target simply by recollecting (recovering) the area ID, which has been assigned by the charging apparatus, from the vehicle.

In accordance with one aspect of the present invention, the charging apparatus further includes a management center. The management center generates the area ID each time when necessary or registers the area ID in a database in advance to remotely manage the area ID with respect to the charging area. The area ID is transmitted to the charging target device either directly from the management center or indirectly from the management center via the charging apparatus.

In the above-described configuration, the management center manages the area IDs collectively and transmits each area ID to the corresponding charging target device directly or indirectly. Accordingly, even when the charging apparatus has a large number of charging areas or the charging areas are located at separate positions in a wide range, the charging apparatus is capable of accurately identifying each charging target device to be recharged in the corresponding charging area and recharging the identified charging target device. That is, the charging apparatus manages a large number of area IDs used for multiple charging areas located in a wide range collectively through the control center. As a result, the non-contact charging system becomes more versatile.

To achieve the foregoing object, the present invention provides a non-contact charging method in which a charging apparatus having intercommunication function for intercommunicating with a charging target device including a storage battery recharges the storage battery by transmitting electric power to the corresponding charging target device in a non-contact manner. The charging apparatus performs:

a. a step for assigning an area ID to a charging area as information for determining the presence of the charging target device and transmitting the assigned area ID; and b. a step for identifying the charging target device as a target of the electric power transmission for the charging apparatus based on return of the transmitted area ID from the charging target device using the intercommunication function, and wherein, through the steps, the charging target device as the electric power transmission target is identified, and the electric power is transmitted to the identified charging target device in a non-contact manner.

In the above-described method, the area ID used by the charging apparatus to determine the presence of the charging target device is assigned to the corresponding charging area, which is included in the charging apparatus. The assigned area ID is transmitted from the charging apparatus to the charging target device. When the charging apparatus receives the transmitted area ID returned by the charging target, the charging apparatus determines that the charging target device that is the transmission source of the returned area ID is the device arranged in the charging area, which is the device as the electric power transmission target. This allows the charging apparatus to identify a charging target device simply by assigning an area ID to each charging area and receiving the area ID returned from the charging target device. That is, the charging apparatus is capable of identifying the device as the charging target without obtaining specific ID or information specific to the charging target device from the charging target device. Also, since the number of the assigned area IDs corresponds to the number of the charging areas, identification of a charging target device is accomplished using only a minimum necessary number of IDs. This facilitates management of the area IDs. As a result, the charging apparatus is allowed to identify a charging target device easily and accurately perform non-contact charging on the charging target device.

In accordance with one aspect of the present invention, as first communication using the intercommunication function, pairing as communication connection setting between the identified charging target device and the charging apparatus is performed based on transmission of the area ID between the charging apparatus and the charging target device through near field communication. As second communication through the intercommunication function, electric power control is performed on the electric power transmitted from the charging area to the charging target device in a non-contact manner through wireless communication different from the near field communication between the paired charging target device and charging apparatus.

In the above-described method, pairing is carried out between the charging apparatus and the charging target device prior to the electric power control through transmission of the area ID between the charging apparatus and the charging target device. Wireless communication for the electric power control is then performed between the paired charging target device and charging apparatus. This allows the charging apparatus to accurately identify the charging target for the wireless communication, even if there is an indefinite number of charging target devices in the vicinity of the charging apparatus and the devices have mutually overlapped communication ranges for the second communication. Accordingly, the aforementioned pairing is established easily and accurately through a simple procedure including transmission and return of the area ID. The electric power control based on the second communication between the paired charging apparatus and charging target device is thus performed accurately. Also, a series of operation from intercommunication to electric power transmission between the charging apparatus and the charging target device is accomplished in a non-contact manner without physically connecting the charging apparatus to the charging target device, for example.

In accordance with one aspect of the present invention, the charging apparatus has a plurality of charging areas including said charging area. In the step for transmitting the area ID, an area ID is assigned to each of the charging areas and transmitted separately. In the step for identifying the charging target device, the charging area and the charging target device each as the electric power transmission target for the charging apparatus are identified based on the transmitted area ID returned from the charging target device.

The present invention is effectively employed particularly in a case in which there are a plurality of charging areas and a plurality of charging target devices, as in the above-described configuration. Specifically, in the above-described method, the charging target devices in the charging areas are identified through transmission and return of the area IDs, which have been assigned to the respective charging areas by the charging apparatus. This allows the charging apparatus to accurately identify each of the charging target devices arranged in the corresponding one of the charging areas. As a result, non-contact charging is performed accurately on the identified one of the charging target devices.

In accordance with one aspect of the present invention, the non-contact charging method further includes a step in which, when the charging target device is to be identified, the charging target device adds a device ID, which is specific information for identifying the charging target device, to the area ID provided by the charging apparatus and returns the device ID and the area ID to the charging apparatus. In the identification step, the charging apparatus identifies the charging target device as the electric power transmission target, including accompanying information of the charging target device, based on the device ID returned from the charging target device together with the area ID.

In the above-described method, the charging apparatus receives the device ID, together with the area ID, from the charging target device. Using the area ID and the device ID, the charging apparatus identifies the charging target device as the electric power transmission target, including the accompanying information belonging to the charging target device. This allows the charging apparatus to obtain the accompanying information of the charging target device including the type and the specifications of the device and the device owner's name, in addition to identifying the charging target device to be recharged. As a result, the charging apparatus is allowed to recharge the charging target device using the accompanying information. This allows the charging apparatus to carry out electric power settings suitable for the type of the charging target device and bill the device owner.

In accordance with one aspect of the present invention, the device ID includes specification information representing the specifications of the charging target device corresponding to the electric power transmission target. When electric power is transmitted to the identified charging target device, the charging apparatus determines the specifications of the charging target device as the electric power transmission target based on the specification information included in the device ID, and sets an electric power corresponding to the determined specifications as an electric power to be transmitted to the charging target device.

The specifications of the charging target devices are varied from one device type to another. It is thus desirable that the value or amount of the electric power to be transmitted from the charging apparatus to each charging target device in a non-contact manner be set in correspondence with the specifications. Accordingly, in the above-described method, the charging target device returns the area ID, which has been transmitted by the charging apparatus, and the device ID including the specification information of the charging target device to the charging apparatus. This allows the charging apparatus to identify the charging target device as the charging target and the specifications of the charging target device. As a result, the charging apparatus is allowed to transmit the electric power corresponding to the specifications of each charging target device, thus properly recharging the charging target device in correspondence with the specifications of the charging target device.

In accordance with one aspect of the present invention, the charging apparatus has a primary coil for electric power transmission in correspondence with the charging area. The charging target device includes a secondary coil electromagnetically coupled to the primary coil. The electric power transmission from the charging apparatus to the identified charging target device is carried out through electromagnetic induction or electromagnetic field resonance between the primary coil and the secondary coil.

In the above-described method, the charging apparatus performs electric power transmission from the charging area to the charging target device through electromagnetic induction or electromagnetic field resonance between the primary coil and the secondary coil. This allows the charging apparatus to accomplish non-contact charging on the charging target apparatus simply by arranging the primary and secondary coils to face each other. As a result, the non-contact charging is performed on the identified charging target device further easily.

In accordance with one aspect of the present invention, in the step for transmitting the area ID, the charging apparatus transmits the area ID to the charging target device using electromagnetic coupling between the primary coil and the secondary coil. The charging target device guides the user of the charging target device to the charging area based on the intensity of a signal communicated between the primary coil and the secondary coil.

In the above-described method, the charging apparatus is allowed to transmit the area ID to the charging target device through a method of, for example, pulse modulation, amplitude modulation, or frequency modulation, by using electromagnetic coupling between the primary coil and the secondary coil. The intensity of the magnetic field of each of the primary and secondary coils characteristically increases locally about the position at which the coils face each other. The magnetic field of each coil is thus maintained in an extremely narrow range. Accordingly, the communication range brought about by the electromagnetic coupling between the primary and secondary coils is limited to a range in the vicinity of the coils. As a result, even when a secondary coil mounted in a certain charging target device is arranged to face a primary coil arranged in a certain charging area and another charging target device having a secondary coil is located adjacent to the aforementioned charging target device, electromagnetic coupling occurs only between the primary coil and the secondary coil facing each other. In other words, the primary coil is electromagnetically coupled only to the secondary coil arranged in the charging area to face the primary coil but not to the secondary coil of the adjacently located charging target device. Specifically, even if there are a plurality of charging target devices each having a secondary coil in the vicinity of a certain charging area, the communication ranges of the secondary coils are prevented from being overlapped with one another. The charging apparatus is thus allowed to transmit only the area ID corresponding to the electric power transmission target to the charging target device located in the corresponding charging area. As a result, the charging apparatus reliably transmits an area ID for identifying a charging target device only to the charging target device to be identified. Also, the primary coil for electric power transmission is mounted typically in the corresponding charging area. As a result, based on the fact that intercommunication is established by electromagnetic coupling between the secondary coil and the primary coil, the charging apparatus is allowed to easily determine that the transmission source of the area ID that has been returned through the aforementioned intercommunication is located in the charging area.

Additionally, in the above-described method, the charging target device is guided to the charging area using the intensity of the signal communicated between the primary coil and the secondary coil. The charging target device is thus guided accurately to the charging area, which is the position where the charging target device faces the primary coil. This ensures not only establishment of intercommunication through the aforementioned electromagnetic coupling but also electric power transmission from the charging apparatus to the charging target device via the primary and secondary coils at the prescribed charging position. As a result, electric power is transmitted with improved efficiency.

In accordance with one aspect of the present invention, the charging target device is an electric vehicle or a hybrid vehicle including the storage battery serving as an electric power source for an electric motor. The charging target device includes a charging station for transmitting the electric power from the charging area to the storage battery of the electric vehicle or the hybrid vehicle.

Charging stations for electric or hybrid vehicles are expected to be used by an indefinite number of vehicles, identifying a charging target is thus particularly important for such charging stations. Specifically, to recharge an electric or hybrid vehicle in a non-contact manner, a charging station must identify a vehicle as a charging target out of other vehicles before transmitting electric power to the vehicle. In the above-described method, the charging station, which is included in the charging apparatus, accurately identifies the vehicle as the charging target simply by recollecting (recovering) the assigned area ID from the vehicle as the charging target.

In accordance with one aspect of the present invention, the charging apparatus includes a management center having a management server. The management server generates the area ID each time when necessary or registers the area ID in a database in advance to perform remote management of the area ID with respect to the charging area. The management center is connected to a network to carry out the remote management. In the step for transmitting the area ID, the area ID is transmitted to the charging target device either directly from the management center or indirectly from the management center via the charging apparatus.

In the above-described method, the management center controls the area IDs collectively and transmits each area ID to the corresponding charging target device directly or indirectly. Accordingly, even when the charging apparatus has a large number of charging areas or the charging areas are located at separate positions in a wide range, the charging target is capable of accurately identifying each charging target device to be recharged in the corresponding charging area and recharging the identified charging target device. That is, the charging apparatus controls a large number of area IDs used for multiple charging areas located in a wide range collectively through the management center. As a result, the non-contact charging system becomes more versatile.

To achieve the foregoing objective, the present invention provides a non-contact charging type vehicle having an electric motor and a storage battery serving as an electric power source for the electric motor. The storage battery is recharged using electric power transmitted from a charging apparatus in a non-contact manner. The vehicle receives an area ID assigned to a charging area of the charging apparatus from the charging apparatus as information used by the charging apparatus to determine the presence of the vehicle. The vehicle includes an in-vehicle communication device for returning the received area ID to the charging apparatus.

Charging stations for electric or hybrid vehicles are expected to be used by an indefinite number of vehicles, identifying a charging target is thus particularly important for such charging stations. Specifically, to recharge an electric or hybrid vehicle in a non-contact manner, a charging station must identify a vehicle as a charging target out of other vehicles before transmitting electric power to the vehicle. In the above-described configuration, the vehicle as the non-contact charging target receives the area ID assigned to the corresponding charging area by the charging apparatus from the charging apparatus using the in-vehicle communication device. The vehicle then returns the received area ID to the charging apparatus. This allows the vehicle as the non-contact charging target to cause the charging apparatus to determine that the vehicle is in the charging area through reception and return of the area ID. As a result, simply by returning the area ID that has been provided by the charging apparatus, the vehicle as the non-contact charging target is allowed to cause the charging apparatus to determine that the vehicle is the non-contact charging target and identify the vehicle, without transmitting the vehicle ID or personal information about the vehicle's owner. In this manner, the charging apparatus identifies the vehicle as the non-contact charging target easily and accurately.

In accordance with one aspect of the present invention, the in-vehicle communication device is configured by: a first in-vehicle communication device for near field use, the first in-vehicle communication device receiving the area ID through wireless communication; and a second in-vehicle communication device, wherein the second-vehicle side communication device returns the area ID received by the first in-vehicle communication device to the charging apparatus, and communicates electric power control information for recharging with the charging apparatus through wireless communication for remote use different from the wireless communication for near field use, the electric power control information being based on pairing, which is communication connection setting between the vehicle and the charging apparatus established by return of the area ID.

In the above-described configuration, through reception of the area ID by the first in-vehicle communication device and return of the area ID from the second in-vehicle communication device to the charging apparatus, pairing is carried out between the charging apparatus and the vehicle as the non-contact charging target prior to the electric power control. Then, electric power control information about charging is then communicated between the paired charging apparatus and vehicle via the second in-vehicle communication device. As a result, even if other vehicles than the vehicle serving as the non-contact charging target are located in the vicinity of the charging apparatus and the vehicles have mutually overlapped communication ranges for the second in-vehicle communication devices, the electric control information is communicated accurately between the vehicle as the target and the charging apparatus based on the pairing. This allows the vehicle to accomplish the aforementioned pairing with the charging apparatus easily and accurately through a simple procedure including reception and return of the area ID. The electric power control, which is to transmit electric power to the vehicle in a non-contact charging manner, is accurately performed. Also, the vehicle as the non-contact charging target is allowed to cause the charging apparatus to accomplish a series of operation from intercommunication to electric power transmission between the vehicle and the charging apparatus in a non-contact manner, without being physically connected to the charging apparatus.

In accordance with one aspect of the present invention, when receiving the area ID, the in-vehicle communication device adds a vehicle ID, which is information specific to the vehicle, to the received area ID and returns the vehicle ID and the area ID to the charging apparatus.

In the above-described configuration, the vehicle as the non-contact charging target by the charging apparatus returns the area ID, which has been provided by the charging apparatus, to the charging apparatus, together with the vehicle ID specific to the vehicle. This allows the vehicle as the non-contact charging target to ensure that the charging apparatus determines that the vehicle is in the charging area and identifies the vehicle type and the specifications of the vehicle based on the vehicle ID transmitted from the vehicle. As a result, the charging apparatus performs electric power settings corresponding to the vehicle type and the specifications of the vehicle, thus allowing the vehicle to receive the electric power corresponding to the characteristics of the vehicle from the charging apparatus.

To achieve the foregoing objective, the present invention provides a non-contact charging management apparatus for managing recharging of a storage battery mounted in a charging target device. The recharging is performed through non-contact transmission of electric power to the charging target device through communication between the non-contact charging management apparatus and the charging target device. The non-contact charging management apparatus includes: an area ID assigning section for assigning an area ID to a charging area or each of a plurality of charging areas as information used by the non-contact charging management apparatus to determine the presence of the charging target device; a charging-side communication section for transmitting each of the area IDs assigned by the area ID assigning section to the charging target device, wherein, when the charging target device returns the transmitted area ID, the charging-side communication section receives the returned area ID; and an electric power transmitting section for identifying the charging area and the charging target device each as the electric power transmission target based on the area ID received by the charging-side communication section, the electric power transmitting section transmitting electric power from the identified charging area to the identified charging target device in a non-contact manner.

In the above-described configuration, the non-contact charging management apparatus assigns the area ID used by the non-contact charging management apparatus to determine the presence of the charging target device to the corresponding charging area and transmits the assigned area ID to the charging target device. When the non-contact charging management apparatus receives the transmitted area ID returned by the charging target device, the non-contact charging management apparatus determines that the charging target device that is the transmission source of the returned area ID is the device arranged in the charging area, which is the device as the electric power transmission target. This allows the non-contact charging management apparatus to identify a charging target device simply by assigning an area ID to each charging area and receiving the area ID returned from the charging target device. That is, the non-contact charging management apparatus is capable of identifying the device as the charging target without obtaining specific ID or information specific to the charging target device from the charging target device. Also, since the number of the assigned area IDs corresponds to the number of the charging areas, the non-contact charging management apparatus is allowed to identify a charging target device using only a minimum necessary number of ID areas. This facilitates management of the area IDs. As a result, the non-contact charging management apparatus is allowed to identify a charging target device easily and accurately and perform non-contact charging on the charging target device.

In accordance with one aspect of the present invention, the in-vehicle communicating section is configured by: a first charging-side communication device for near field use, the first charging-side communication device transmitting the area ID to the charging target device through the communication; and a second charging-side communication device, wherein the second charging-side communication device communicates electric power control information for the recharging with the charging target device through wireless communication for remote use, which is different from wireless communication for near field use, the electric power control information being based on pairing, which is communication connection setting between the charging-side target device and the non-contact charging management apparatus established at the time when the charging target device returns the area ID that has been transmitted by the first charging-side communication device.

In the above-described configuration, through reception and return of the area ID between the non-contact charging management apparatus and the charging target device, pairing is carried out between the non-contact charging management apparatus and the charging target device as the non-contact charging target prior to the electric power control. Then, electric power control information is then communicated between the paired non-contact charging management apparatus and charging target device via the second in-vehicle communication device. As a result, even if there are other charging target devices in the vicinity of the non-contact charging management apparatus and the charging target devices have mutually overlapped communication ranges for the second in-vehicle communication devices, the electric control information is communicated accurately between the charging target device and the non-contact charging management apparatus based on the pairing. This allows the non-contact charging management apparatus to establish the aforementioned pairing easily and accurately through a simple procedure including transmission and return of the area ID between the non-contact charging management apparatus and the charging target device. The electric power control, which is to transmit electric power to the charging target device, is accurately performed. Also, according to the present invention, a series of operation from intercommunication to electric power transmission between the non-contact charging management apparatus and the charging target device is accomplished in a non-contact mariner, without physically connecting the non-contact charging management apparatus to the charging target device.

In accordance with one aspect of the present invention, the charging target device is an electric vehicle or a hybrid vehicle including the storage battery serving as an electric power source for an electric motor. The area ID assigning section, the charging-side communication section, and the electric power transmitting section are mounted in a charging station for transmitting electric power to the electric vehicle or the hybrid vehicle.

Charging stations for electric or hybrid vehicles are expected to be used by an indefinite number of vehicles. identifying a charging target is thus particularly important for such charging stations. Specifically, to recharge an electric or hybrid vehicle in a non-contact manner, a charging station must identify a vehicle as a charging target out of other vehicles before transmitting electric power to the vehicle. In the above-described configuration, the charging station is allowed to accurately identify the vehicle as the charging target simply by receiving the assigned area ID from the vehicle as the charging target.

In accordance with one aspect of the present invention, the non-contact charging management apparatus being configured by: a charging apparatus for transmitting the electric power; and a management center that has a management server and is network-connected to the charging apparatus, the management server generating the area ID each time when necessary or registering the area ID in a database in advance to manage the area ID. The area ID assigning section and the charging-side communication section are mounted in the management server. The electric power transmitting section is arranged in the charging apparatus. The charging-side communication section delivers the area ID either indirectly from the management center to the charging target device via the charging apparatus or directly from the management center to the charging target device.

In the above-described configuration, the management center controls the area IDs collectively and transmits each area ID to the corresponding charging target device directly or indirectly. Accordingly, even when the charging apparatus has a large number of charging areas or the charging areas are located at separate positions in a wide range, the non-contact charging management apparatus is capable of accurately identifying each charging target device to be recharged in the corresponding charging area and recharging the identified charging target device. That is, the non-contact charging management apparatus manages a large number of area IDs used for multiple charging areas located in a wide range collectively through the management center. As a result, the non-contact charging management apparatus becomes more versatile.

BRIEF DESCRIPTION OF THE DRAWINGS

FIG. 2 is a table representing examples of area IDs generated by an area ID generating section;

FIGS. 3(a) and 3(b) are diagrams showing the relationship between signal intensity detected by an electromagnetic wave detecting section and the position of a primary coil L1;

FIG. 4 is a table representing examples of accompanying information registered in an accompanying information memory area;

FIG. 9 is a table representing an example of accompanying information registered in a accompanying information memory area for another embodiment of a non-contact charging system, a non-contact charging method, a non-contact charging type vehicle, and a non-contact charging management apparatus according to the present invention;

FIG. 10 is a block diagram schematically representing a conventional non-contact charging system.

DETAILED DESCRIPTION OF THE PREFERRED EMBODIMENTS

First Embodiment

A first embodiment of a non-contact charging system, a non-contact charging method, a non-contact charging type vehicle, and a non-contact charging management apparatus according to the present invention will now be descried with reference to FIGS. 1 to 7. In the first embodiment, a charging target device is an electric vehicle or a hybrid vehicle having a storage battery serving as an electric power supply for an electric motor.

Figure 1:
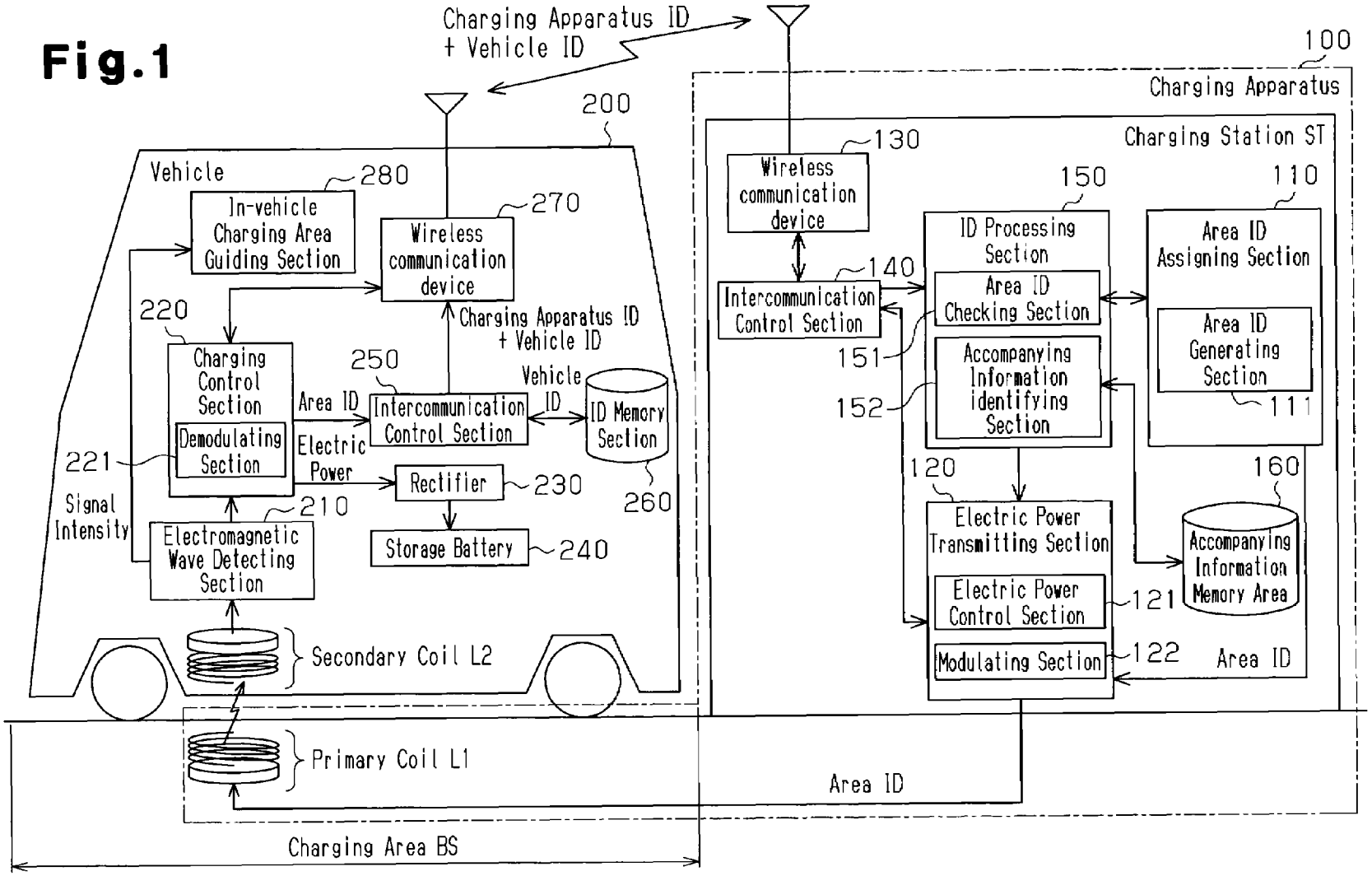
FIG. 1 is a block diagram schematically representing a first embodiment of a non-contact charging system, a non-contact charging method, a non-contact charging type vehicle, and a non-contact charging management apparatus according to the present invention.

As illustrated in FIG. 1, the non-contact charging system of the first embodiment is configured mainly by a charging apparatus 100, which transmits electric power to a charging target device in a non-contact manner, and a vehicle 200 serving as the charging target device.

The charging apparatus 100 has an area ID assigning section 110 for assigning area IDs, which are information for determining the presence of the vehicle 200, to respective charging areas BS each for receiving the vehicle 200. The area ID assigning section 110 includes an area ID generating section 111 for generating area IDs for the respective charging areas BS, which are managed by the charging apparatus 100.

With reference to FIG. 2, the area ID generating section 111 generates area ID1 to area IDn for respective charging areas BS1 to BSn, which are managed by the charging apparatus 100. In the first embodiment, the area ID generating section 111 produces the area IDs each time recharging is completed for the vehicle 200, which is the charging target. The area ID assigning section 110 then outputs the area ID1 to area IDn, which have been generated by the area ID generating section 111, to an electric power transmitting section 120. The electric power transmitting section 120 transmits electric power to the vehicle 200 in a non-contact manner.

The electric power transmitting section 120 has an electric power control section 121, which sets a charging condition for the vehicle 200 and controls the electric power transmitted to the vehicle 200. The electric power transmitting section 120 also includes a modulating section 122, which modulates area ID signals including the area ID1 to area IDn provided by the area ID assigning section 110. Specifically, when it is determined that the vehicle 200 is in any one of the charging areas BS, the electric power control section 121 sets a charging condition for the vehicle 200 and transmits the electric power to the vehicle 200 in correspondence with the charging condition. When the charging apparatus 100 performs recharging, the electric power set by the electric power control section 121 is transmitted to a corresponding primary coil L1 for electric power transmission. When receiving the area ID1 to area IDn from the area ID assigning section 110, the modulating section 122 modulates the area ID signals including the area ID1 to area IDn and outputs each of the modulated area ID signals to the primary coil L1 for electric power transmission. In this example, an area ID is assigned as ID specific to each of the charging areas BS. Specifically, modulation of the area ID signals by the modulating section 122 includes pulse modulation such as pulse width modulation, pulse amplitude modulation, pulse density modulation, pulse position modulation, and pulse code modulation.

In the first embodiment, the primary coil L1 functions as a first feeding-side communication device and a secondary coil L2 functions as a first in-vehicle communication device.

The primary coils L1 are embedded in the ground surface in correspondence with the charging areas BS. When the vehicle 200 is in any one of the charging areas BS, the associated primary coil L1 transmits a modulated area ID signal, which has been modulated by the modulating section 122, to the secondary coil L2 mounted in a lower portion of the vehicle 200. When guided to the position facing the primary coil L1, the secondary coil L2 is electromagnetically coupled to the primary coil L1. The primary coil L1 and the secondary coil L2 thus establish near field communication for the area ID. When the charging apparatus 100 transmits electric power, the primary coil L1 transmits the electric power to the secondary coil L2 through electromagnetic induction or electromagnetic field resonance between the primary coil L1 and the secondary coil L2.

The vehicle 200 has an in-vehicle electromagnetic wave detecting section 210 for detecting electromagnetic waves of the secondary coil L2, which is produced through electromagnetic induction or electromagnetic coupling between the primary coil L1 and the secondary coil L2. Specifically, the in-vehicle electromagnetic wave detecting section 210 detects electromagnetic waves (signals), which are changed by transmission of an area ID or electric power through the primary coil L1, and outputs the detected electromagnetic wave to an in-vehicle charging control section 220 and an in-vehicle charging area guiding section 280.

The in-vehicle charging control section 220 detects a recharging state of a storage battery 240 based on the electric power transmitted from the charging apparatus 100 and controls a charging mode for the storage battery 240. The in-vehicle charging control section 220 also includes a demodulating section 221 for demodulating signals that have been detected by the in-vehicle electromagnetic wave detecting section 210.

When receiving a modulated area ID signal from the charging apparatus 100, the demodulating section 221 demodulates the modulated area ID. The demodulating section 221 then provides the demodulated area ID to an in-vehicle intercommunication control section 250, which is mounted in the vehicle 200 to control wireless communication between the vehicle 200 and the charging apparatus 100.

When the charging apparatus 100 transmits electric power to the vehicle 200 for recharging, the in-vehicle charging control section 220 transmits the electric power, which has been received from the in-vehicle electromagnetic wave detecting section 210 as electromagnetic waves, to an in-vehicle rectifier 230 for rectifying the electric power. The in-vehicle rectifier 230 rectifies the electric power and transmits the rectified electric power to the storage battery 240, which is installed in the vehicle 200. In this manner, the storage battery 240 is recharged by the electric power supplied from the charging apparatus 100 through the secondary coil L2, the in-vehicle electromagnetic wave detecting section 210, and the in-vehicle rectifier 230. The recharging state of the storage battery 240 is monitored by the in-vehicle charging control section 220.

When receiving an area ID from the charging apparatus 100, the in-vehicle intercommunication control section 250 extracts a vehicle ID specific to the vehicle 200 from a vehicle ID memory section 260 memorizing the vehicle ID. The in-vehicle intercommunication control section 250 then associates the vehicle ID to the area ID and outputs the vehicle ID and the area ID to an in-vehicle wireless communication device 270 as a second in-vehicle communication device.

The in-vehicle wireless communication device 270 functions as intercommunication means for second communication, which is different from the primary coil L1 and the secondary coil L2. The in-vehicle wireless communication device 270 performs wireless communication between the vehicle 200 and the charging apparatus 100. The in-vehicle wireless communication device 270 transmits the vehicle ID and the area ID, which have been input from the in-vehicle intercommunication control section 250, to the charging apparatus 100 through its intercommunication function. Specifically, the in-vehicle intercommunication control section 250 of the vehicle 200 returns the area ID, which has been assigned to the corresponding charging area BS and then transmitted by the charging apparatus 100, to the charging apparatus 100 and transmits the vehicle ID specific to the vehicle 200, together with the area ID, to the charging apparatus 100.

The in-vehicle charging area guiding section 280 is configured by, for example, a car navigation system. The in-vehicle charging area guiding section 280 generates guiding information for guiding the driver (the user) of the vehicle 200 to move the vehicle 200 to a prescribed position in the charging area BS based on the signal intensity detected by the in-vehicle electromagnetic wave detecting section 210. In other words, with reference to FIGS. 3(a) and 3(b), the signal intensity (the intensity of the electromagnetic waves) of the primary coil L1 characteristically increases focally at a position immediately above the primary coil L1 and decreases rapidly past the position in a lateral direction. Accordingly, in the first embodiment, referring to FIG. 3(a), the in-vehicle charging area guiding section 280 generates guiding information for guiding the driver to move the secondary coil L2 to a position immediately above the primary coil L1 such that the signal intensity detected by the in-vehicle electromagnetic wave detecting section 210 becomes greater than or equal to a charging permitting intensity V1, which is a threshold value for ensuring a sufficient signal intensity for smooth recharging. The in-vehicle charging area guiding section 280 guides the driver to move the vehicle 200 based on the generated guiding information through a non-illustrated display or speech device, which is mounted in the passenger compartment of the vehicle 200. In the first embodiment, by guiding the vehicle 200 through such guiding, the primary coil L1 and the secondary coil L2 face each other. As a result, the secondary coil L2 mounted in the vehicle 200 is guided to a prescribed charging position CA, thus allowing highly efficient transmission of electric power between the primary coil L1 and the secondary coil L2.

In FIG. 3(b), in the charging area BS into which the vehicle 200 is moved, a zone receiving the primary coil L1 and having a diameter slightly greater than the diameter of the primary coil L1, as viewed from above, is represented as a prescribed charging position CA. At the charging position CA, the intensity of a signal from the primary coil L1 produced through electromagnetic induction or electromagnetic field resonance exceeds the charging permitting intensity V1. As is clear from the graph, the signal intensity from the primary coil L1 quickly drops past the charging position CA in a lateral (horizontal) direction. By way of example, a state in which the secondary coil L2 as a whole is inside the charging position CA without even a portion of the secondary coil L2 maintained outside the charging position CA is referred to as a state in which "the secondary coil L2 is located immediately above the primary coil L1". That is, when the secondary coil L2 is immediately above the primary coil L1, the secondary coil L2 smoothly receives electric power from the primary coil L1 using a signal intensity that is greater than or equal to the charging permitting intensity V1. In the first embodiment, it is assumed that the intensity of the area ID signal from the primary coil L1 and the intensity of the electric power for recharging the vehicle 200 both vary in the same manner as the signal intensity illustrated in FIG. 3(b).

The in-vehicle charging area guiding section 290 determines the signal intensity from the primary coil L1 through the secondary coil L2. When the signal intensity is less than the charging permitting intensity V1, the in-vehicle charging area guiding section 290 determines that the secondary coil L2 is not immediately above the primary coil L1 but displaced from the charging position CA and then starts guiding the driver. In other words, when not located immediately above the primary coil L1 , the secondary coil L2 cannot receive a modulated area IDsignal from the primary coil L1 by sufficient signal intensity. The in-vehicle charging area guiding section 290 is thus prevented from identifying the area ID but allowed to determine that the signal intensity is less than the charging permitting intensity V1. Accordingly, based on the determination, the in-vehicle charging area guiding section 290 guides the driver to move the vehicle 200 to the charging position CA. Since the area ID emitted from the primary coil L1 is received by the secondary coil L2 only when the secondary coil L2 is in the proximity of the primary coil L1 (the charging position CA), security is ensured.

The charging apparatus 100 includes a charging-side wireless communication device 130 serving as the second charging-side communication device, which is intercommunication means different from the primary coil L1. The charging-side wireless communication device 130 receives an area ID and a vehicle ID from the in-vehicle wireless communication device 270 of the vehicle 200. The charging-side wireless communication device 130 communicates information for controlling the electric power fur recharging the vehicle 200 with the in-vehicle wireless communication device. When receiving the area ID from the in-vehicle wireless communication device 270 of the vehicle 200, the charging-side wireless communication device 130 outputs the received area ID to a charging-side intercommunication control section 140, which controls modes of intercommunication between the charging-side wireless communication device 130 and the in-vehicle wireless communication device 270 of the vehicle 200. When receiving the vehicle ID, which is provided by the in-vehicle wireless communication device 270 of the vehicle 200 together with the area ID, the charging-side wireless communication device 130 outputs the received vehicle ID to the charging-side intercommunication control section 140. The charging-side intercommunication control section 140 then outputs the area ID and the vehicle ID, which have been obtained from the vehicle 200, to an ID) processing section 150 for processing the area ID and the vehicle ID.

The ID processing section 150 includes an area ID checking section 151 for checking the area ID returned from the vehicle 200 and an accompanying information identifying section 152 for identifying accompanying information such as the specifications of the vehicle 200 based on the vehicle ID received from the vehicle 200. In the first embodiment, the ID processing section 150 and the electric power transmitting section 120 configure the electric power transmitting section described in the claims.

When receiving the area ID returned from the vehicle 200 via the charging-side wireless communication device 130, the area ID checking section 151 checks whether the area ID is the area ID that has been assigned by the area ID assigning section 110, or, in other words, the area ID that has been assigned by the charging apparatus 100 to the corresponding charging area BS. The area ID checking section 151 also determines which one of the charging areas BS managed by the charging apparatus 100 the area ID sent from the vehicle 200 through the charging wireless communication device 130 corresponds to. The area ID checking section 151 outputs the result of checking to the charging-side intercommunication control section 140.

Based on the result of checking provided by the area ID checking section 151, the charging-side intercommunication control section 140 establishes pairing, which is a communication connection setting, between the in-vehicle wireless communication device 270 of the vehicle 200 that has transmitted the area ID and the charging-side wireless communication device 130 of the charging apparatus 100. Specifically, based on the fact that the area ID that has been assigned by the charging apparatus 100 to the corresponding charging area BS is returned to the charging apparatus 100, the charging apparatus 100 determines that the vehicle 200, which is the charging target, is located in the charging area BS and that the area ID has been wirelessly transmitted from the vehicle 200.

In the first embodiment, based on the pairing established as return of the area ID, the charging apparatus 100 causes the wireless communication devices 130 and 270 to communicate electric power control information for controlling the electric power transmitted to the vehicle 200. In this manner, even when there is another vehicle near the charging area BS and the vehicle has wireless communication function and is capable of communicating with the charging-side wireless communication device 130 of the charging apparatus 100, the vehicle is prevented from erroneously identified as the charging target. This allows the charging apparatus 100 to accurately identify the vehicle 200 located in the charging area BS, thus ensuring wireless communication accurately between the charging apparatus 100 and identified the vehicle 200. Through such intercommunication, the wireless communication devices 130 and 270 communicate information about the storage battery 240 including, for example, its recharging state, recharging capacity, remaining recharging amount, and time for completing recharging. Then, the charging-side wireless communication device 130 of the charging apparatus 100 outputs the information to the electric power transmitting section 120. The in-vehicle wireless communication device 270 of the vehicle 200 also transmits the information to the electric power transmitting section 120.

The ID processing section 150 further includes the accompanying information identifying section 152 for identifying accompanying information about the vehicle 200 based on the vehicle ID received from the vehicle 200 through the charging-side wireless communication device 130. When obtaining the vehicle ID of the vehicle 200, the accompanying information identifying section 152 identifies the accompanying information of the vehicle 200 with reference to the vehicle ID and an accompanying information memory area 160, in which the accompanying information of the vehicle 200 is associated to the vehicle ID.

As illustrated in FIG. 4, the accompanying information memory area 160 registers, in advance, information about the vehicles corresponding to the vehicle ID1 to the vehicle IDn for the respective vehicle IDs. The information about each of the vehicles includes the type and the specifications of the vehicle and the charging condition for the storage battery mounted in the vehicle. In the first embodiment, with reference to the accompanying information memory area 160, the accompanying information identifying section 152 identifies the specifications of the vehicle 200 and obtains information about the charging condition such as the value of the electric power to be transmitted to the vehicle 200 or the battery capacity. After having obtained the information about the charging condition of the vehicle 200, the accompanying information identifying section 152 sends the information to the electric power transmitting section 120.

Based on the information about the charging condition provided by the accompanying information identifying section 152, the electric power control section 121 of the electric power transmitting section 120 sets the charging condition for the vehicle 200, which has returned the area ID assigned by the charging apparatus 100. Also, when obtaining the information about the recharging state of the storage battery 240, for example, based on the information communicated between the wireless communication devices 130 and 270, the electric power control section 121 computes the time necessary for completing recharging and transmits information regarding the determined time for completing recharging to the vehicle 200 through the charging-side wireless communication device 130. The vehicle 200 then displays the received information on, for example, a display device of a car navigation system. If determining that recharging of the storage battery 240 is complete based on the obtained recharging state of the storage battery 240, the electric power control section 121 suspends transmission of electric power to the vehicle 200.

In the above-described manner, the vehicle 200 receives electric power from the charging apparatus 100 through electric power control executed based on pairing established between the vehicle 200 and the charging apparatus 100.

In the first embodiment, the area ID assigning section 110, the electric power transmitting section 120, the charging-side wireless communication device 130, the charging-side intercommunication control section 140, the ID processing section 150, and the accompanying information memory area 160 configure a charging station ST. Also, in the embodiment, the charging apparatus 100 configures a non-contact charging management apparatus.

Figure 5:
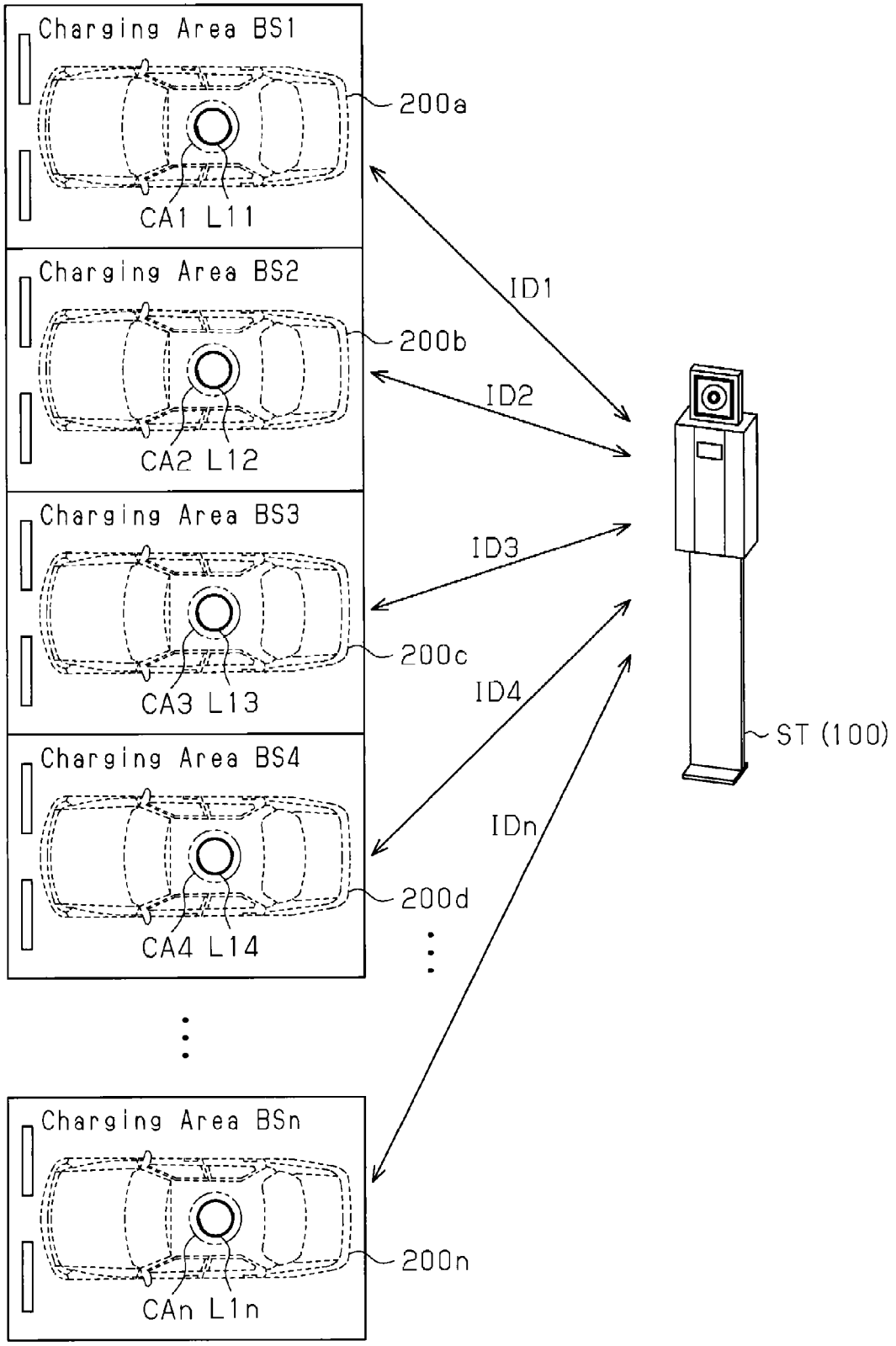
FIG. 5 is a block diagram representing the relationship between a charging station and vehicles arranged in charging areas according to the first embodiment.

Referring to FIG. 5, the non-contact charging system of the first embodiment has a plurality of charging areas BS1 to BSn, which are adjacently arranged, as management targets for the charging apparatus 100. The charging areas BS1 to BSn include corresponding primary coils L11 to L1n and receive, for example, corresponding vehicles 200a to 200n as charging targets. The charging apparatus 100 assigns a corresponding one of the area ID1 to area IDn for each one of the charging areas BS1 to BSn. The charging apparatus 100 then transmits the area ID1 to area IDn to the corresponding vehicles 200a to 200n, which are in the corresponding charging areas BS1 to BSn, through the primary coils L11 to L1n. Subsequently, the vehicles 200a to 200n return the received area ID1 to area IDn to the charging apparatus 100 via the in-vehicle wireless communication devices 270, which are mounted in the vehicles 200a to 200n. Then, based on the returned area ID1 to area IDn, the charging apparatus 100 identifies the charging areas BS1 to BSn and the vehicles 200a to 200n, which are electric power transmission targets. In this manner, pairing between the charging apparatus 100 and the respective vehicles 200a to 200n is established.

In the first embodiment, the magnetic field produced by each of the primary coils L11 to L1n serving as the first communication device is maintained in a local range. In other words, each primary coil L11 to L1n only has a local communication range. This prevents each adjacent pair of the communication ranges from being overlapped with each other, as illustrated in FIG. 5 as the charging positions CA1 to CAn. Specifically, each of the charging positions CA1 to CAn is only a zone having a slightly larger diameter than the diameter of each primary coil L11 to L1n. The charging positions CA1 to CAn are thus maintained in the corresponding charging areas BS1 to BSn, each of which is sized sufficiently for accommodating the vehicle 200. As a result, the charging positions CA to CAn are set such that the charging positions CA1 to CAn are not overlapped with one another. In this manner, the charging apparatus 100 is allowed to transmit the area ID1 to area IDn only to the corresponding vehicles 200a to 200n, which are received in the charging areas BS1 to BSn. This accurately establishes pairing based on transmission and return of the area ID1 to area IDn.

In the first embodiment, such pairing is carried out prior to wireless communication between the wireless communication devices 130 and 270. As a result, even when there is a vehicle near the charging area BS and the vehicle has wireless communication function and is capable of communicating with the charging-side wireless communication device 130 of the charging apparatus 100, the vehicle is prevented from being erroneously identified as a charging target. This allows the charging apparatus 100 to accurately identify the vehicle 200 in the charging area 135, thus ensuring wireless communication accurately between the charging apparatus 100 and the identified vehicle 200.

An example of operation of the non-contact charging system according to the first embodiment will hereafter be described with reference to FIG. 6.

Figure 6:
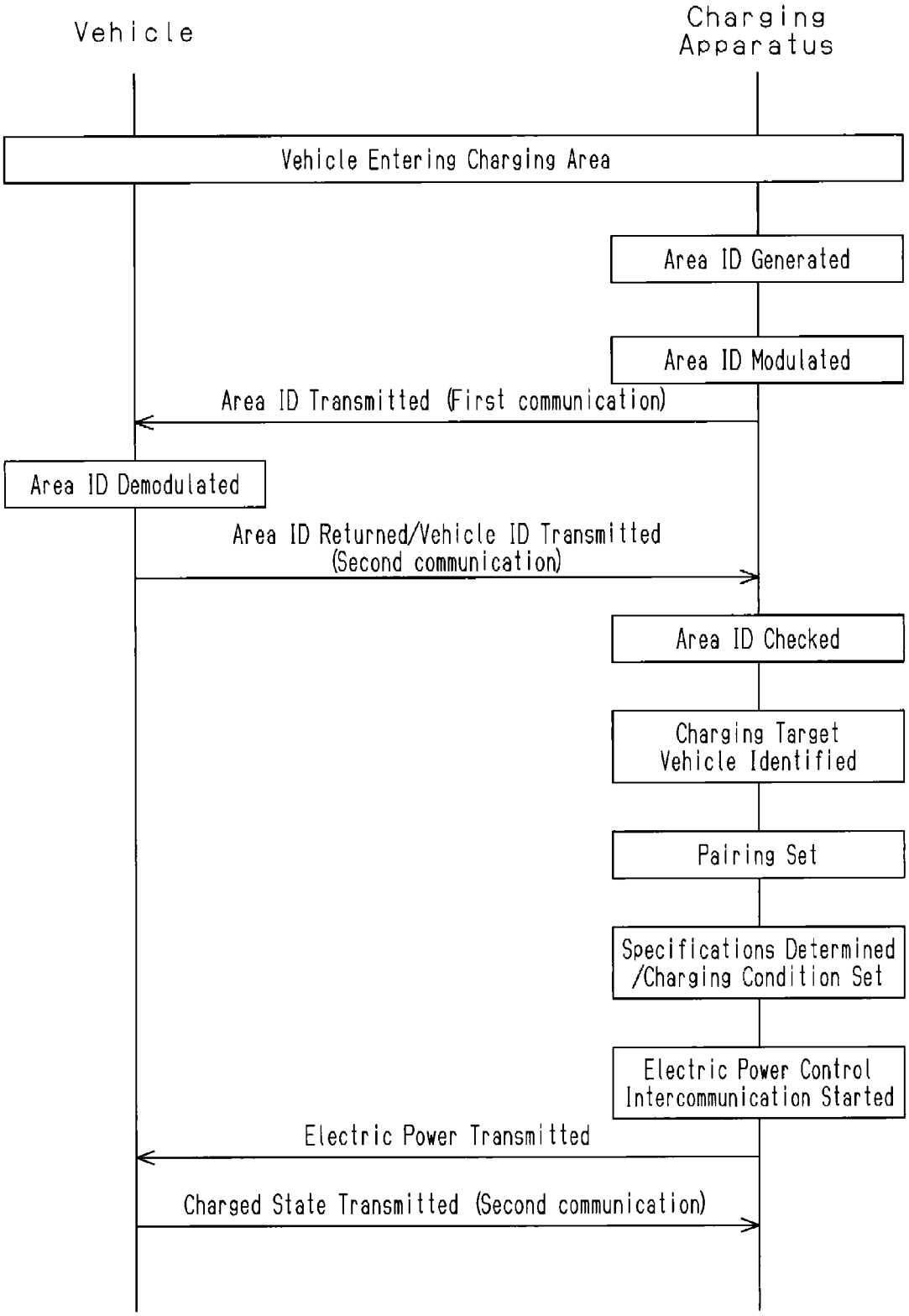
FIG. 6 is a sequence chart representing a non-contact charging procedure according to the first embodiment.

With reference to FIG. 6, when the vehicle 200 as the charging target enters the charging area BS of the charging apparatus 100, the charging apparatus 100 generates an area ID assigned to the charging area BS that the vehicle 200 has entered. The charging apparatus 100 then modulates an area ID signal including the generated area ID, thus producing a modulated area ID signal. The charging apparatus 100 sends the modulated ID signal to the vehicle 200, which is in the charging area BS, through the primary coil L1 embedded in the charging area BS.

In the first embodiment, transmission of the area ID from the charging apparatus 100 to the vehicle 200 via the primary coil L1 and the secondary coil L2 corresponds to the first communication.

When receiving the area ID from the charging apparatus 100, the vehicle 200 demodulates the area ID and returns the demodulated area ID to the charging apparatus 100 via the in-vehicle wireless communication device 270. At this stage, the vehicle 200 transmits the vehicle ID of the vehicle 200, together with the area ID provided by the charging apparatus 100, to the charging apparatus 100.

In response to reception of the returned area ID and the transmitted vehicle ID from the vehicle 200, the charging apparatus 100 checks the area ID. Specifically, the charging apparatus 100 determines whether the area ID sent from the vehicle 200 corresponds to the area ID that the charging apparatus 100 has assigned to the charging area BS. If the charging apparatus 100 determines that the area ID from the vehicle 200 is the area ID that has been assigned by the charging apparatus 100 base on the result of checking, the charging apparatus 100 confirms that the vehicle 200 is in the charging area BS and identifies the vehicle 200 as the charging target. Afterwards, the charging apparatus 100 establishes pairing between the in-vehicle wireless communication device 270 of the identified vehicle 200 and the charging-side wireless communication device 130 of the charging apparatus 100.

The charging apparatus 100 identifies the specifications of the vehicle 200 and the charging condition for the vehicle 200 with reference to the vehicle ID provided by the vehicle 200. Then, based on the result of pairing with the vehicle 200, the charging apparatus 100 starts to communicate the electric power control information through wireless communication between the two wireless communication devices 130 and 270. Under such electric power control between the wireless communication devices 130 and 270, the charging apparatus 100 transmits electric power to the vehicle 200 through the primary coil L1 and the secondary coil L2, thus recharging the storage battery 240 mounted in the vehicle 200.

In the first embodiment, by performing wireless communication for the electric power control based on the pairing established through transmission and return of the area ID, recharging of the vehicle 200 and intercommunication between the charging apparatus 100 and the vehicle 200 are established without physically connecting the charging apparatus 100 and the vehicle 200 to each other.

A guiding procedure performed by the in-vehicle charging area guiding section 280 of the first embodiment will hereafter be described with reference to FIG. 7.

Figure 7:
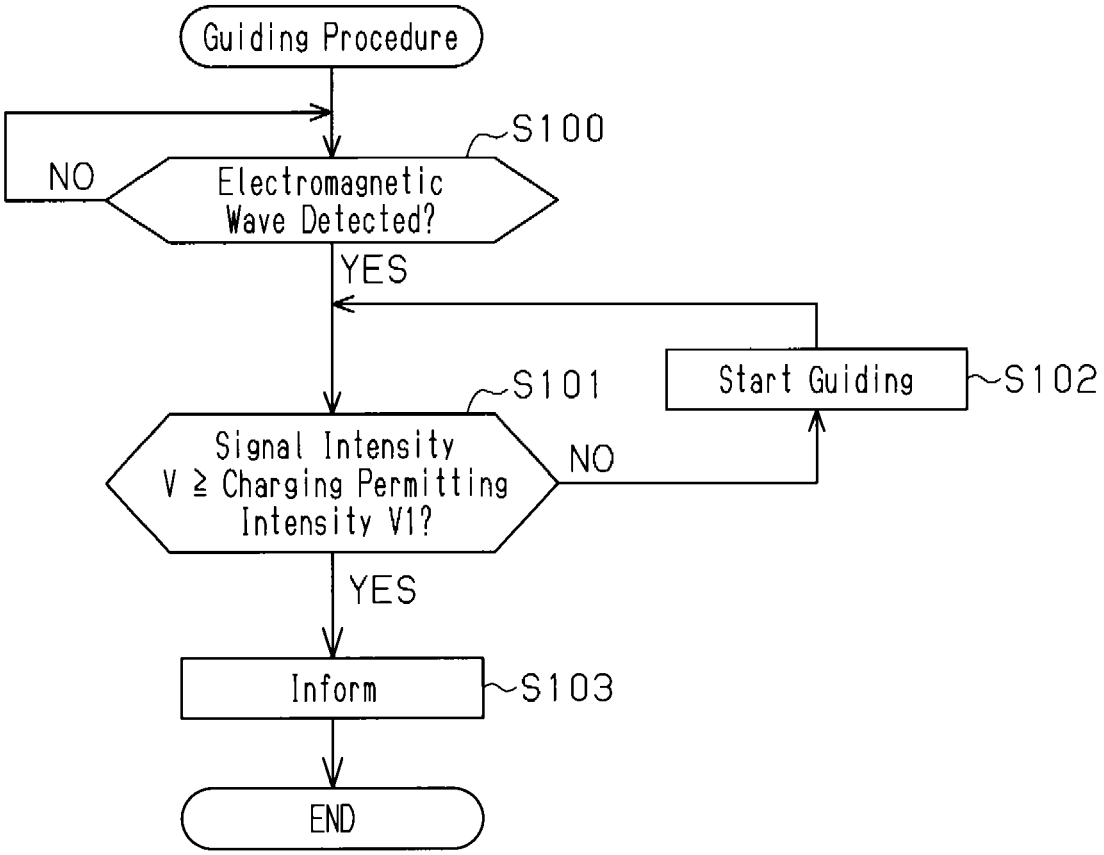
FIG. 7 is a flowchart representing a guiding procedure of the first embodiment.

Referring to FIG. 7, the guiding procedure is started by determining whether the in-vehicle electromagnetic wave detecting section 210 has detected electromagnetic waves in Step S100. Then, it is determined whether the signal intensity V detected by the in-vehicle electromagnetic wave detecting section 210 has reached the charging permitting intensity V1, which allows transmission of electric power from the primary coil L1 to the secondary coil L2 (Step S101).

If the secondary coil L2 of the vehicle 200 is not located near the position immediately above the primary coil L1, which is embedded in the ground surface, and the detected signal intensity V is determined to be less than the charging permitting intensity V1, the in-vehicle charging area guiding section 280 guides the driver of the vehicle 200 in such a direction that the signal intensity V increases. Specifically, the driver of the vehicle 200 is guided through image display or speech guidance through a car navigation system, for example, to move the vehicle 200 in such a direction that the signal intensity V increases (Step S101: NO; Step S102).

When the secondary coil L2 is thus brought to the position facing the primary coil L1 and the signal intensity V becomes greater than or equal to the charging permitting intensity V1, the in-vehicle charging area guiding section 280 informs the driver of the vehicle 200 that the vehicle 200 is located at the designated position in the charging area BS (Step S101: YES; Step S103).

In this manner, the vehicle 200 as the charging target is guided to the prescribed position in the charging area BS. This ensures accurate and highly efficient transmission from the primary coil L1 to the secondary coil L2 of not only the area ID but also the electric power.

As has been described, the non-contact charging system, the non-contact charging method, the non-contact charging type vehicle, and the non-contact charging management apparatus according to the first embodiment have the advantages described below.

(1) The charging apparatus 100 assigns the area ID to the charging area BS as information for determining presence of the vehicle 200, which is the charging target, and transmits the assigned area ID to the vehicle 200. When the transmitted area ID is returned from the vehicle 200, the charging apparatus 100 identifies the vehicle as the electric power transmission target. The charging apparatus 100 then transmits electric power to the vehicle 200, which is the identified charging target device, in a non-contact manner Accordingly, the charging apparatus 100 is capable of assigning area IDs to respective charging areas BS and identifying the vehicle 200 as the charging target simply by recollecting the corresponding one of the assigned area IDs from the vehicle 200. The vehicle 200 as the charging target is thus identified without obtaining information specific to the vehicle 200 as the charging target or the driver of the vehicle 200. Further, the number of the area IDs assigned by the charging apparatus 100 corresponds to the number of the charging areas BS managed by the charging apparatus 100. This allows identification of the vehicle 200 using a minimum necessary number of IDs, thus facilitating management of the area IDs. As a result, the vehicle 200 as the charging target is identified easily and accurately, thus enabling non-contact charging of the vehicle 200.

(2) As the first communication through the intercommunication function, pairing is performed between the vehicle 200, which has been identified based on transmission of the area ID between the charging apparatus 100 and the vehicle 200, and the charging apparatus 100. As the second communication through the intercommunication function, the electric power transmitted from the charging area BS to the vehicle 200 in a non-contact manner is subjected to the electric power control through wireless communication between the vehicle 200 and the charging apparatus 100, which have been paired, by means of the corresponding wireless communication devices 130 and 270. In this manner, the aforementioned pairing is established easily and accurately through such a simple procedure, which is transmission and return of the area ID. Further, the electric power is controlled accurately through the second communication between the charging apparatus 100 and the vehicle 200, which have been paired. As a result, a series of operation from intercommunication to electric power transmission is established between the charging apparatus 100 and the vehicle 200 as the charging target in a non-contact manner, without physically connecting the charging apparatus 100 to the vehicle 200.

(3) The charging apparatus 100 manages the multiple charging areas BS1 to BSn and assigns the area ID1 to area IDn for the respective charging areas BS1 to BSn. The charging apparatus 100 transmits each of the assigned area IDs to the corresponding one of the charging areas BS1 to BSn. Then, based on the area ID1 to area IDn returned from the corresponding vehicles 200a to 200n, the charging apparatus 100 identifies the charging area BS and the vehicle 200 each serving as the electric power transmission target. The charging apparatus 100 then transmits the electric power from the identified charging area BS to the identified vehicle 200 in a non-contact manner. In this manner, each one of the charging areas BS1 to BSn and the corresponding one of the vehicles 200a to 200n are identified and non-contact charging is accurately performed in the identified charging area BS1 to BSn.

(4) When the vehicle 200 returns the area ID to the charging apparatus 1110, the vehicle ID of the vehicle 200 is added to the area ID. Based on the vehicle ID returned with the area ID from the vehicle 200, the charging apparatus 100 determines the specifications of the vehicle 200, which is the electric power transmission target. The charging apparatus 100 sets the electric power corresponding to the specifications as the electric power to be transmitted to the vehicle 200. As a result, even when various types of vehicles 200 having different specifications use the charging apparatus 100, non-contact charging is carried out accurately in correspondence with the specifications of each of the vehicles 200.

(5) The charging apparatus 100 includes the primary coil L1 for electric power transmission corresponding to each charging area BS. The vehicle 200 has the primary coil L2, which is electromagnetically coupled to the primary coil L1. The electric power is transmitted from the charging area BS to the vehicle 200 through electromagnetic induction or electromagnetic field resonance between the primary coil L1 and the secondary coil L2. Accordingly, electric power transmission to the vehicle 200 is allowed to happen simply by arranging the secondary coil L2 to face the primary coil L1, which is embedded in the charging area BS. Also, non-contact charging is carried out on the identified vehicle 200 further easily.

(6) The charging apparatus 100 transmits each area ID through electromagnetic coupling between the primary coil L1 and the secondary coil L2. This allows transmission of the area ID prior to the aforementioned pairing through a further simple configuration without arranging additional near field intercommunication means for transmitting the area ID from the charging apparatus 100 to the vehicle 200. Also, in this manner, the area ID for identifying the vehicle 200 is reliably transmitted only to the vehicle 200 located in the corresponding charging area BS. Further, the primary coil L1 is employed for each charging area BS and arranged integrally with the charging area BS. As a result, when intercommunication is established between the primary coil L1 and the secondary coil L2 through electromagnetic coupling between the coils L1 and L2, it is easily determined that the vehicle 200, which is the source that has transmitted the area ID returned through the aforementioned intercommunication, is located in the charging area BS.

(7) The in-vehicle charging area guiding section 280, which is mounted in the vehicle 200, guides the driver of the vehicle 200 to move the vehicle 200 to the prescribed position in the charging area BS based on the signal intensity communicated between the primary coil L1 and the secondary coil L2. This allows not only the aforementioned intercommunication through electromagnetic coupling but also electric power transmission by the primary coil L1 and the secondary coil L2 at the prescribed charging position. As a result, electric power is transmitted with improved efficiency.

(8) The vehicle 200, which is an electric vehicle or a hybrid vehicle, is the non-contact charging target. The charging apparatus 100 is the charging station for transmitting electric power to the vehicle 200. As a result, in the above-described configuration, the vehicle as the charging target is accurately identified simply by recollecting the area ID that has been assigned by the charging apparatus from the vehicle as the charging target.

(9) The vehicle 200 has the in-vehicle wireless communication device 270, which receives the area ID and returns the received area ID to the charging apparatus 100. This allows the vehicle 200 to operate the charging apparatus 100 to determine and identify that the vehicle 200 is the charging target located in the charging area BS, simply by returning the area ID that has been transmitted from the charging apparatus 100 to the charging apparatus 100. As a result, before recharging the vehicle 200 in a non-contact manner, the charging apparatus 100 identifies the vehicle 200 as the non-contact charging target easily and accurately.

(10) The in-vehicle communication device of the vehicle 200 is configured by the first in-vehicle communication device (the secondary coil L2) for near field intercommunication, which receives the area ID through wireless communication, and the second in-vehicle communication device (the in-vehicle wireless communication device 270). The second in-vehicle communication device returns the area ID to the charging apparatus 100 and communicates the electric power control information based on the aforementioned pairing through wireless communication for remote communication. This allows the pairing to be established easily and accurately through a simple procedure including reception of the area ID by the secondary coil L2 and return of the received area ID by the in-vehicle wireless communication device 270. Also, a series of operation from intercommunication to electric power transmission is accomplished between the charging apparatus 100 and the vehicle 200 as the non-contact charging target in a non-contact manner, without physically connecting the charging apparatus 100 to the vehicle 200.

(11) The in-vehicle wireless communication device 270 mounted in the vehicle 200 returns the area ID received from the charging apparatus 100 with the vehicle ID added to the area ID. This allows the vehicle 200 as the non-contact charging target to operate the charging apparatus 100 to perform electric power setting corresponding to the type and specifications of the vehicle 200. The vehicle 200 thus receives the electric power corresponding to the characteristics of the vehicle 200.

(12) The non-contact charging management apparatus, which is the charging apparatus 100, includes the area ID assigning section 110, the primary coil L1 for transmitting the area ID assigned by the area ID to the vehicle 200, and the charging-side wireless communication device 130 for receiving the area ID returned from the vehicle 200. The charging apparatus 100 has the ID processing section 150, which identifies the charging area BS and the vehicle 200 each as a target of the electric power transmission based on the aforementioned area ID, and the electric power transmitting section 120, which transmits electric power from the identified charging area BS to the identified charging apparatus 100 in a non-contact manner. This allows the charging apparatus 100 to identify the vehicle 200 as the charging target simply by assigning the area IDs to the respective charging areas BS managed by the charging apparatus 100 and recollecting the corresponding one of the assigned area IDs from the vehicle 200. In this manner, the charging apparatus 100 identifies the vehicle 200 as the charging target without obtaining ID information for identifying the vehicle 200 from the vehicle 200. This also allows the charging apparatus 100 to identify the vehicle 200 as the charging target simply by employing a minimum necessary number of area IDs in correspondence with the number of the charging areas BS managed by the charging apparatus 100, thus facilitating management of the area IDs.

(13) The charging-side communication section of the charging apparatus 100 includes the primary coil L1 for near field intercommunication, which transmits the area ID to the vehicle 200, and the charging-side wireless communication device 130. The charging-side wireless communication device 130 communicates information for the electric power control with the in-vehicle wireless communication device 270 of the vehicle 200 based on the pairing established through return of the area ID from the vehicle 200. Accordingly, even when there are multiple vehicles having wireless communication functions near the charging apparatus 100 or any charging area BS managed by the charging apparatus 100 and the vehicles have overlapped communication ranges for the charging-side wireless communication device 130, the charging apparatus 100 is allowed to accurately communicate the information for the electric power control with the vehicle 200 based on the aforementioned pairing. Accordingly, the pairing is established easily and accurately through a simple procedure such as transmission and return of the area ID. The electric power transmitted to the charging target device is thus controlled accurately. Also, a series of operation from intercommunication to electric power transmission is accomplished between the charging apparatus 100 and the vehicle 200 in a non-contact manner, without physically connecting the charging apparatus 100 to the vehicle 200.

Second Embodiment

A second embodiment of the non-contact charging system, the non-contact charging method, the non-contact charging type vehicle, and the non-contact charging management apparatus according to the present invention will now he described with reference to FIG. 8. The second embodiment has a management center 300 for remotely managing the area IDs additionally to the first embodiment. The basic configuration of the second embodiment is identical to the configuration of the first embodiment.

Figure 8:
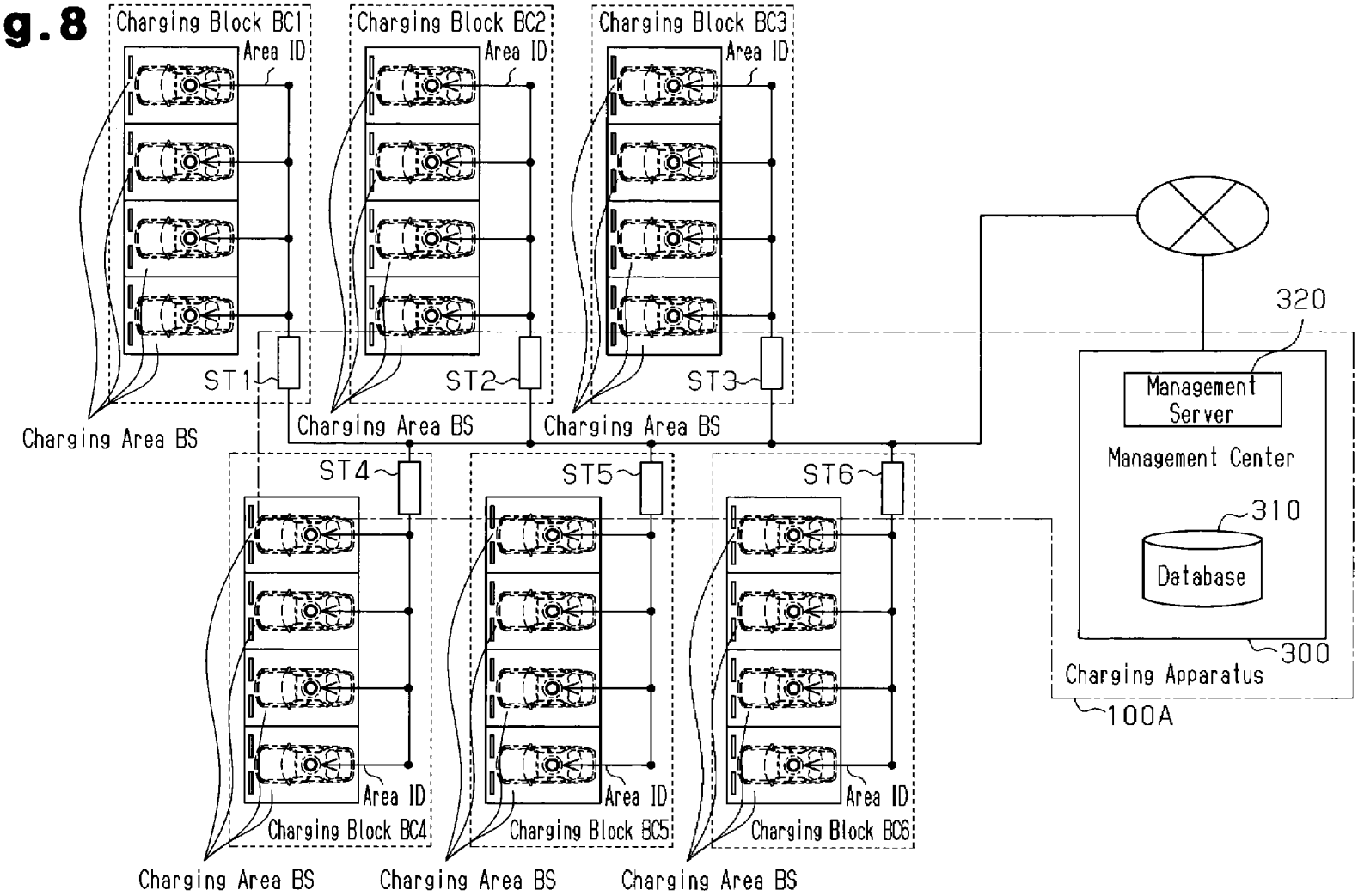
FIG. 8 is a block diagram schematically representing a second embodiment of a non-contact charging system, a non-contact charging method, a non-contact charging type vehicle, and a non-contact charging management apparatus according to the present invention.
Figure 11:
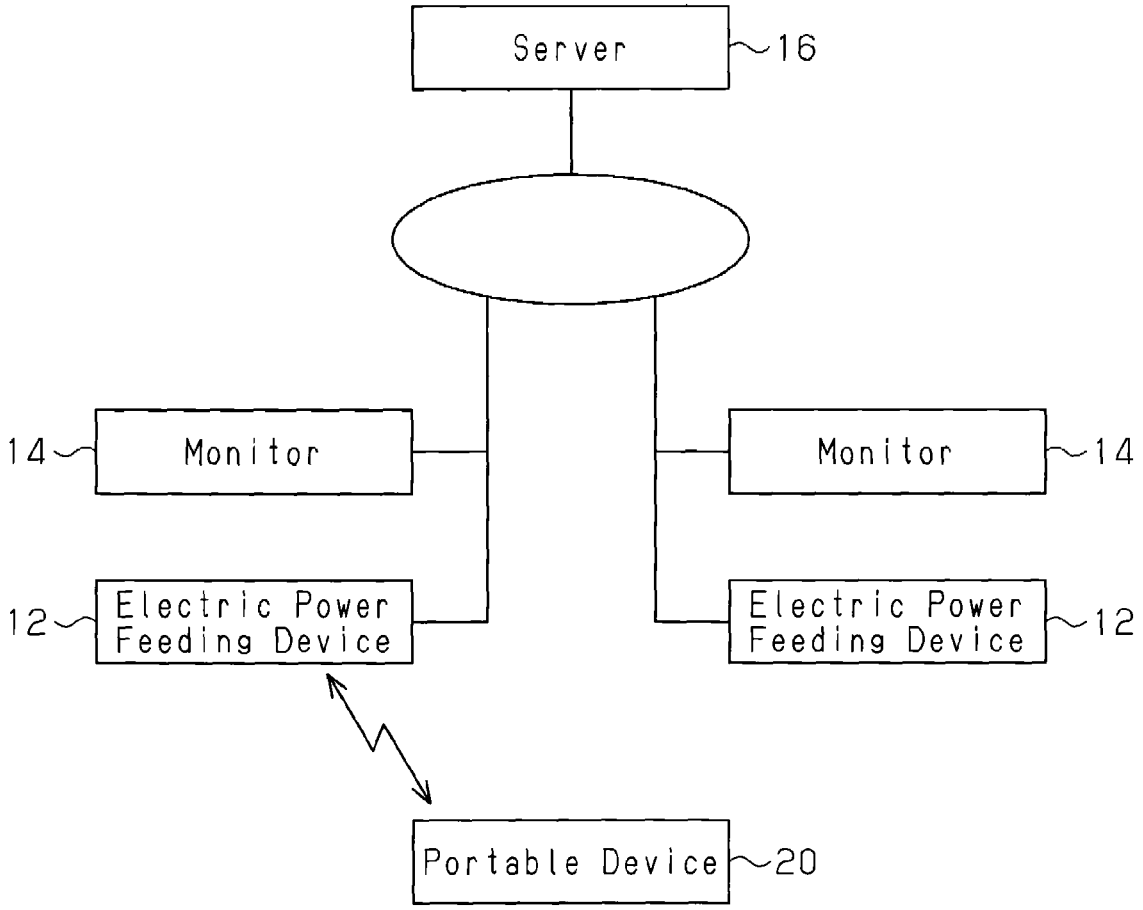
Fig.11 (Prior Art)
FIG. 11 is a block diagram schematically representing another conventional non-contact charging system.

FIG. 8 is a diagram corresponding to FIGS. 1 and 5, schematically representing the non-contact charging system of the second embodiment. The same or like reference numerals are given to components shown in FIG. 8 that are the same as or like corresponding components shown in FIG. 1 or 5 and repeated description of these components are omitted herein.

With reference to FIG. 8, a charging apparatus 100A of the second embodiment is configured by a plurality of charging stations ST1, ST2, ST3, ST4, ST5, and ST6 and the management center 300. The charging stations ST1 to ST6 manage corresponding charging blocks BC1, BC2, BC3, BC4, BC5, and BC6 and the management center 300 remotely manages area 11)s used for the charging blocks BC1 to BC6. Each of the charging blocks BC1 to BC6 includes a plurality of charging areas BS. For example, the charging block BC1 has four charging areas BS and the charging block BC2 includes four other charging areas BS. In the second embodiment, the charging stations ST1 to ST6 and the management center 300 configure the non-contact charging management apparatus.

The management center 300 has a database 310, which registers the area IDs assigned to the respective charging areas BS of each charging block BC1 to BC6 in advance in, for example, the manner illustrated in FIG. 2. The management center 300 of the second embodiment also includes a management server 320 for managing the database 310. The management server 320 collectively manages the area IDs used by the charging blocks BC1 to BC6, which are managed by the corresponding charging stations ST1 to ST6. The management server 320 is network-connected to the charging stations ST1 to ST6 and capable of remotely communicating with the charging stations ST1 to ST6.

In the second embodiment, when assigning the area IDs, the management server 320 of the management center 300 distributes the area IDs stored in the database 310 to the corresponding charging stations ST1 to ST6. Then, each charging station ST1 to ST6 assigns the area IDs, which have been received from the management center 300, to the corresponding charging areas BS managed by the charging station ST1 to ST6. In this manner, based on the assigned area IDs, each charging station ST1 to ST6 performs the first communication, the electric power transmission, and the second communication as needed, as in the first embodiment. Specifically, in the first communication, each charging station ST1 to ST6 transmits the corresponding one of the assigned area IDs to the vehicle 200 in the charging area BS managed by the charging station ST1 to ST6 to carry out pairing between the charging area BS and the vehicle 200. The second communication is performed to control the electric power for recharging. As a result, the management center 300 performs non-contact charging based on the area IDs, which are remotely managed.

As has been described, the non-contact charging system, the non-contact charging method, the non-contact charging type vehicle, and the non-contact charging management apparatus according to the second embodiment have the advantages (1) to (13) of the first embodiment and the additional advantage described below.

(14) The management center 300 remotely manages the area IDs used for the respective charging stations ST1 to ST6 with respect to the corresponding charging areas BS. The management center 300 transmits each area ID to the vehicle 200 located in the corresponding charging area BS indirectly through the corresponding charging station ST1 to ST6. Accordingly, even when the charging areas BS are located at different positions in a relatively wide area, the charging apparatus 100A accurately identifies each vehicle 200 to be recharged in the corresponding charging area BS and recharges the identified vehicle 200. This allows the management center 300 to collectively manage the area IDs used for the multiple charging areas BS in the wide area, thus allowing a wider range of use of the non-contact charging system. Also, it is unnecessary for each charging station ST1 to ST6 to generate and manage the area IDs assigned to the charging areas BS managed by the charging station ST1 to ST6. This simplifies the configuration of each charging station ST1 to ST6.

The illustrated embodiments may be modified to the forms described below.

In the illustrated embodiments, the charging apparatus 100 (which includes the charging apparatus 100A illustrated in FIG. 8 as needed herein) constantly distributes the area IDs. However, the area IDs may be distributed when it is detected that the magnetic field of any one of the primary coils L1 has been changed by the secondary coil L1 approaching the primary coil L1 or that the vehicle 200 has entered any one of the charging areas BS using means such as a sensor or camera for detecting a vehicle, which is mounted in the charging area BS.

In the illustrated embodiments, the charging apparatus 100 modulates the signals for transmitting the area IDs but transmits the area IDs in plaintext. However, the charging apparatus 100 may encrypt each area ID for a temporary period and transmit the encrypted area ID to the vehicle 200. This improves confidentiality of the area ID and prevents unauthorized use of the area ID.

In the second embodiment, the management center 300 transmits the area IDs indirectly via the corresponding charging stations ST1 to ST6. However, the management center 300 may transmit each area ID to the vehicle 200 in the corresponding charging area BS only through the primary coil L1 directly without using the charging stations ST1 to ST6. In this case, pairing with the vehicle 200 may be established when the corresponding charging station ST receives the area ID returned from the vehicle 200.

In the second embodiment, the management center 300 manages the area IDs and performs the second communication between the vehicle 200 and the corresponding charging station ST1 to ST6. However, the management center 300 may have the above-described electric power transmitting section 120 and establish pairing with the vehicle 200 using the area ID that has been assigned by the management center 300. The management center 300 then remotely manages the electric power transmitted to the vehicle 200 based on the pairing. In this case, the management center 300 may collectively manage assignment of the area IDs and electric power transmission to the charging blocks BC1 to BC6 each for receiving the corresponding vehicle 200.

In the second embodiment, the management center 300 has the database 310. However, the database 310 may be omitted. In this case, the management center 300 generates an area ID to be assigned to each charging area BS and transmits the generated area ID each time when necessary.

In the first embodiment, the charging apparatus 100 includes the area ID generating section 111. However, instead of the area ID generating section 111, the charging apparatus 100 may have a database that registers area IDs assigned to the charging areas BS in advance. In this case, the charging apparatus 100 reads out the area IDs from the database and transmits the area IDs to assign the area IDs.

In the illustrated embodiments, the driver is guided to move the vehicle 200 to the prescribed position in each charging area BS through image display or speech guidance by a car navigation system. However, instead of this, the vehicle 200 may include an illumination device for guiding the driver, which is installed in the passenger compartment of the vehicle 200 and turned on when the signal intensity of the secondary coil L2 becomes greater than or equal to the charging permitting intensity V1. In this case, the vehicle 200 is guided to the prescribed position in the charging area BS through a comparatively simple configuration.

In the illustrated embodiments, the vehicle 200 is guided to each charging area BS by the in-vehicle charging area guiding section 280, which is mounted in the vehicle 200, using the signal intensity of the signal from the primary coil L1 detected by the in-vehicle electromagnetic wave detecting section 210, which is also arranged in the vehicle 200. However, instead of this, the charging apparatus 100 may detect a change in the magnetic field of the primary coil L1 caused by the secondary coil L2 approaching the primary coil L1 and generate guiding information for moving the secondary coil L2 to the position immediately above the primary coil L1 based on the result of detection. In this case, the charging apparatus 100 transmits the generated guiding information to the vehicle 200 through the primary coil L1 serving as the first communication device or the charging-side wireless communication device 130. The vehicle 200 then guides the driver using the guiding information, which has been provided by the charging apparatus 100. Alternatively, the vehicle 200 may be guided in any other suitable manner as long as the vehicle 200 as the non-contact target is moved to such a position that electric power can be transmitted between the secondary coil L2 mounted in the vehicle 200 and the primary coil L1. In other words, guiding through detection of the signal intensity from the primary coil L1 may be omitted if position detection and guiding for the vehicle 200 are performed all visually using, for example, a camera device mounted in the vehicle or the charging apparatus 100, which determines the location of the vehicle 200 and guides the vehicle 200.

In the illustrated embodiments, intercommunication of area ID signals through electromagnetic coupling between the primary coil L1 and the secondary coil L2 is carried out through pulse modulation. However, instead of this, intercommunication between the primary coil L1 and the secondary coil L2 may be performed through amplitude modulation or frequency modulation.

In the illustrated embodiments, an area ID is transmitted from the charging apparatus 100 to the vehicle 200 using electromagnetic coupling between the primary coil L1 and the secondary coil L2. However, transmission of the area ID from the charging apparatus 100 to the vehicle 200 may be accomplished through Bluetooth (registered trade mark) or infrared communication using another wireless communication device, without using the primary coil L1 or the secondary coil L2. In other words, any other suitable method may be employed in near field intercommunication of the area IDs from the charging apparatus 100 to the charging areas BS as long as the method allows the charging apparatus 100 to transmit each area ID locally to the corresponding charging area BS.

In the illustrated embodiments, electric power is transmitted from the charging apparatus 100 to the vehicle 200 through electromagnetic induction or electromagnetic field resonance between the primary coil L1 and the secondary coil L2. However, instead of this, the charging apparatus 100 may transmit electric power to the vehicle 200 using a microwave transmission method or an evanescent wave transmission method. That is, the present invention is employable for any other suitable form of electric power transmission from the charging apparatus 100 to the vehicle 200 as long as it is non-contact transmission.

In the illustrated embodiments, the accompanying information memory area 160 of the charging apparatus 100 registers information about the specifications and the charging condition of the vehicle 200 as the accompanying information associated to the vehicle ID. However, instead of this, as illustrated in, for example, FIG. 9 corresponding to FIG. 4, the user's name of the vehicle 200 and the billing state of the user for each time of using the charging apparatus 100 may be associated with the corresponding vehicle ID as the accompanying information regarding the vehicle 200. The associated information is then registered in the accompanying information memory area 160. The charging apparatus 100 may update the billing information registered in the accompanying information memory area 160 each time the user (the driver) of the vehicle 200 uses the charging apparatus 100 for battery recharging. This configuration allows the charging apparatus 100 to manage the billing information for use of recharging by the charging apparatus 100 additionally, thus improving usefulness of the charging apparatus 100.

In the illustrated embodiments, the information about the specifications of the vehicle 200 is associated with the vehicle ID of the vehicle 200 and registered in the accompanying information memory area 160 of the charging apparatus 100. The charging apparatus 100 refers to the accompanying information memory area 160 using the vehicle ID provided by the vehicle 200 to determine the specifications of the vehicle 200. However, instead of this, if the vehicle ID of the vehicle 200 includes information about the specifications of the vehicle 200, the charging apparatus 100 may determine the specifications of the vehicle 200 based on the information about the specifications without referring to the accompanying information memory area 160. Alternatively, the charging apparatus 100 may associate identification information specific to the user of the vehicle 200 as the non-contact charging target, such as the driver's license number, with the charging condition of the vehicle 200 and register the associated information in the accompanying information memory area 160 in advance. The vehicle 200 transmits the identification information to the charging apparatus 100 together with the area ID. In this case, by referring to the accompanying information memory area 160 using the identification information received from the vehicle 200, the charging apparatus 100 obtains the information regarding the charging condition associated with the identification information.

In the illustrated embodiments, the charging apparatus 100 identifies the specifications of the vehicle 200 as the charging target and sets the charging condition for the storage battery 240 in correspondence with the identified specifications. However, if it is clear that charging conditions are the same for a certain period of time or in a certain area and the vehicle 200 can he recharged by the electric power transmitted from the charging apparatus 100 in a non-contact manner, the charging apparatus 100 may recharge the vehicle 200 without specifying the specifications of the vehicle 200.

In the illustrated embodiments, the vehicle 200 transmits the vehicle ID of the vehicle 200, together with the assigned area ID, to the charging apparatus 100. The charging apparatus 100 identifies the accompanying information of the vehicle 200 using the vehicle ID provided by the vehicle 200. However, even without the vehicle ID transmitted from the vehicle 200 to the charging apparatus 100, the charging apparatus 100 can smoothly determine that the vehicle 200 is in the charging area BS by using the area ID. Accordingly, the accompanying information memory area 160 of the charging apparatus 100 and the vehicle ID memory section 260 of the vehicle 200 may be omitted. This simplifies the configuration of the charging apparatus 100 and the configuration of the vehicle 200.

In the second embodiment, the management center 300 assigns the area IDs to the multiple charging blocks BC1 to BC6. However, instead of this, the management center 300 may assign area IDs to a single charging block BC.

In the illustrated embodiments, the charging apparatus 100 has the multiple charging areas BS and assigns an area ID to each one of the charging areas BS. However, the charging apparatus 100 may include a single charging area BS and assign and transmit an area ID to the charging area BS to perform the above-described pairing.

In the illustrated embodiment, the driver moves the vehicle 200 as a whole with respect to the primary coil L1 to bring the secondary coil L2 to the position facing the primary coil L1. However, instead of this, the vehicle 200 may include an actuator for moving the secondary coil L2 independently from the other components of the vehicle 200 such that the secondary coil L1 is sent to the position facing the primary coil L1. In this case, such movement of the secondary coil L2 is controlled by the in-vehicle charging area guiding section 290. Alternatively, an actuator may be installed in the ground surface to move the primary coil L1 flexibly with respect to the ground surface such that the primary coil L1 is arranged at the position facing the secondary coil L2.

In the illustrated embodiments, as the first communication brought about by the intercommunication function, the primary coil L1 and the secondary coil L2 perform pairing between the charging apparatus 100 and the vehicle 200 using the area ID. The information for the electric power control is communicated through wireless communication different from the first communication. However, the information for the electric power control for recharging the vehicle 200 through the charging apparatus 100 may be communicated using the same communication device used also in transmission of the area ID from the charging apparatus 100 to the vehicle 200. Since the communication device must transmit the area ID, it is preferable that the communication device be directional. Specifically, as long as the charging apparatus 100 transmits the area ID to the vehicle 200 and the vehicle 200 returns the area ID to the charging apparatus 100 to allow the charging apparatus 100 to determine that the vehicle 200 is the charging target, any suitable mode of communication may be carried out between the charging apparatus 100 and the vehicle 200.

In the illustrated embodiments, the charging apparatus 100 transmits electric power to a hybrid vehicle or an electric vehicle as a non-contact charging target. However, a charging target device as a charging target of the charging apparatus 100 may be a portable device such as a cellular phone. That is, the present invention may be used in any suitable charging target device as long as the device is rechargeable in a non-contact manner.

100,100A...charging apparatus, 110...area ID assigning section, 111 . . . area ID generating section, 120 . . . electric power transmitting section, 121 . . . electric power control section, 122 . . . modulating section, 130 . . . charging-side wireless communication device, 140 . . . charging-side communication control section, 150...ID processing section, 151 ...area ID checking section, 152...accompanying information identifying section, 160 . . . accompanying information memory area, 200 and 200a to 200n...vehicle, 210...in-vehicle electromagnetic wave detecting section, 220 . . . in-vehicle charging control section, 221...demodulating section, 230 . . . in-vehicle rectifier, 240 . . . storage battery, 250 . . . in-vehicle communication control section, 260 . . . ID memory section, 270 . . . in-vehicle wireless communication device, 280 . . . in-vehicle charging area guiding section, 300 . . . management center, 310...database, 320... management server, L1 and L11 to L1n...primary coil, L2...secondary coil, ST and ST1 to ST6 . . . charging station, BC1 to BC6...charging block, BS and BS1 to BSn...charging area

The invention claimed is:

1. A non-contact charging system comprising:

a [charging target device] *vehicle* having a storage battery; and a [charging apparatus] *charging station* having *an* intercommunication function for intercommunicating with the [charging target device] *vehicle*, *wherein* the [system transmitting] *charging station is configured to transmit* electric power to the [corresponding charging target device] *vehicle* in a non-contact manner to recharge the storage battery, [wherein]

the charging [apparatus assigns an area] *station is configured to transmit an area* ID serving as information for determining a charging area, in which the [charging target device] *vehicle* exists, [to a charging area, in which transmission of electric power to the charging target device is performed, and transmits the assigned area ID] *the area ID being assigned to a plurality of charging areas*, the [charging apparatus identifies the charging area, in which the charging target device as a target of the electric power transmission exists, based on return of] *vehicle is configured to return* the transmitted area ID [from the charging target device through the intercommunication function], and the charging [apparatus transmits] *station is configured to control the transmission of* the electric power to the [charging target device, which exists in the identified charging area, in a non-contact manner] *vehicle based upon receipt of the transmitted area ID from the vehicle through the intercommunication function*.

2. The non-contact charging system according to claim 1, wherein as *a* first communication [using] *through* the intercommunication function, pairing, as *a* communication connection [setting] between the [identified charging target device] *vehicle* and the charging [apparatus] *station* is performed [through] *based on the* transmission of the area ID between the charging [apparatus] *station* and the [charging target device] *vehicle* through near field communication, and as *a* second communication through the intercommunication function, electric power control is performed, on the electric power transmitted from the charging [area] *station* to the [charging target device] *vehicle* in [a] *the* non-contact manner, through wireless communication [different from the near field communication between the paired charging target device and charging apparatus].

[3. The non-contact charging system according to claim 1, wherein the charging apparatus has a plurality of charging areas one of which is said charging area, assigns an area ID to each of the charging areas, and separately transmits the assigned area IDs, and when the charging target device returns the corresponding one of the transmitted area IDs to the charging apparatus, the charging apparatus identifies the charging area and the charging target device each as the electric power transmission target based on the returned area ID, and transmits the electric power from the identified charging area to the identified charging target device in a non-contact manner.]

[4. The non-contact charging system according to claim 1, wherein the charging target device adds a device ID, which is specific information for identifying the charging target device, to the area ID provided by the charging apparatus, and returns the device ID and the area ID to the charging apparatus, and the charging apparatus identifies the charging target device as the electric power transmission target including accompanying information of the charging target device based on the device ID returned from the charging target device together with the area ID.]

[5. The non-contact charging system according to claim 4, wherein the device ID includes specification information representing the specifications of the charging target device corresponding to the electric power transmission target, and the charging apparatus determines the specifications of the charging target device as the electric power transmission target based on the specification information included in the device ID, and sets an electric power corresponding to the determined specifications as an electric power to be transmitted to the charging target device.]

6. The non-contact charging system according to claim 1, wherein the charging [apparatus] *station* has a primary coil for electric power transmission [in correspondence with the charging area], the [charging target device] *vehicle* includes a secondary coil electromagnetically coupled to the primary coil, and the electric power transmission, from the charging [area] *station* to the [charging target device] *vehicle* is carried out through electromagnetic induction or electromagnetic field resonance between the primary coil and the secondary coil.

7. The non-contact charging system according to claim 6, wherein the charging [apparatus] *station* transmits the area ID to the [charging target device] *vehicle* using electromagnetic coupling between the primary coil and the secondary coil[, and the charging target device guides the user of the charging target device to the charging area based on the intensity of a signal communicated between the primary coil and the secondary coil].

8. The non-contact charging system according to claim 1, wherein the [charging target device] *vehicle* is an electric vehicle or a hybrid vehicle including the storage battery serving as an electric power source for an electric motor, and the [charging apparatus includes a] charging station [for transmitting] *transmits* the electric power [from the charging area] to the storage battery of the electric vehicle or the hybrid vehicle.

[9. The non-contact charging system according to claim 1, wherein the charging apparatus further includes a management center, the management center generating the area ID each time when necessary or registers the area ID in a database in advance to remotely manage the area ID with respect to the charging area, and the area ID is transmitted to the charging target device either directly from the management center or indirectly from the management center via the charging apparatus.]

10. A non-contact charging method in which a charging [apparatus] *station* having *an* intercommunication function for intercommunicating with a [charging target device] *vehicle* including a storage battery recharges the storage battery by transmitting electric power to the [corresponding charging target device] *vehicle* in a non-contact manner, *the method comprising:*

[wherein the charging apparatus performs:

a. step for assigning an area ID] *transmitting, from the charging station, an area ID* serving as information for determining a charging area, in which the [charging target device] *vehicle* exists, [to a charging area, in which transmission of electric power to the charging target device is performed, and transmitting the assigned area ID] *the area ID being assigned to each of a plurality of charging areas*;

*returning, from the vehicle, the transmitted area ID;* and

*controlling, at the charging station, the transmission of the electric power to the vehicle based upon receipt of the transmitted area ID from the vehicle through the intercommunication function*

[b. a step for identifying the charging area, in which the charging target device as a target of the electric power transmission from the charging apparatus exists, based on return of the transmitted area ID from the charging target device through the intercommunication function, and wherein, through the steps, the charging area, in which the charging target device as the electric power transmission target exists, is identified, and the electric power is transmitted to the charging target device, which exists in the identified charging area, in a non-contact manner].

11. The non-contact charging method according to claim 10, [wherein] *further comprising:*

*performing,* as *a* first communication using the intercommunication function, pairing, as communication connection [setting] between the [identified charging target device] *vehicle* and the charging [apparatus is performed] *station* based on transmission of the area ID between the charging [apparatus] *station* and the [charging target device] *vehicle* through near field communication, and

*performing,* as *a* second communication through the intercommunication function, electric power control [is performed], on the electric power transmitted from the charging [area] *station* to the [charging target device] *vehicle* in [a] *the* non-contact manner, through wireless communication [different from the near field communication between the paired charging target device and charging apparatus].

[12. The non-contact charging method according to claim 10, wherein the charging apparatus has a plurality of charging areas including said charging area, in the step for transmitting the area ID, an area ID is assigned to each of the charging areas and transmitted separately, and in the step for identifying the charging target device, the charging area and the charging target device each as the electric power transmission target for the charging apparatus are identified based on the transmitted area ID returned from the charging target device.]

[13. The non-contact charging method according to claim 10, further including a step in which, when the charging target device is to be identified, the charging target device adds a device ID, which is specific information for identifying the charging target device, to the area ID provided by the charging apparatus and returns the device ID and the area ID to the charging apparatus, wherein, in the identification step, the charging apparatus identifies the charging target device as the electric power transmission target, including accompanying information of the charging target device, based on the device ID returned from the charging target device together with the area ID.]

[14. The non-contact charging method according to claim 13, wherein the device ID includes specification information representing the specifications of the charging target device corresponding to the electric power transmission target, and when electric power is transmitted to the identified charging target device, the charging apparatus determines the specifications of the charging target device as the electric power transmission target based on the specification information included in the device ID, and sets an electric power corresponding to the determined specifications as an electric power to be transmitted to the charging target device.]

15. The non-contact charging method according to claim 10, wherein the charging [apparatus] *station* has a primary coil for electric power transmission [in correspondence with the charging area], the [charging target device] *vehicle* includes a secondary coil electromagnetically coupled to the primary coil, and the electric power transmission, from the charging [apparatus] *station* to the [identified charging target device] *vehicle* is carried out through electromagnetic induction or electromagnetic field resonance between the primary coil and the secondary coil.

16. The non-contact charging method according to claim 15, [wherein:

in the step for transmitting the area ID, the charging apparatus transmits the area ID to the charging target device using electromagnetic coupling between the primary coil and the secondary coil, and the charging target device guides the user of the charging target device to the charging area based on the intensity of a signal communicated between the primary coil and the secondary coil] *wherein transmitting, from the charging station, the area ID includes transmitting the area ID to the vehicle using electromagnetic coupling between the primary coil and the secondary coil.*

17. The non-contact charging method according to claim 10, wherein the [charging target device] *vehicle* is an electric vehicle or a hybrid vehicle including the storage battery serving as an electric power source for an electric motor, and the [charging target device includes a] charging station [for transmitting] *transmits* the electric power [from the charging area] to the storage battery of the electric vehicle or the hybrid vehicle.

[18. The non-contact charging method according to claim 10, wherein the charging apparatus includes a management center having a management server, the management server generating the area ID each time when necessary or registers the area ID in a database in advance to perform remote management of the area ID with respect to the charging area, the management center being connected to a network to carry out the remote management, and in the step for transmitting the area ID, the area ID is transmitted to the charging target device either directly from the management center or indirectly from the management center via the charging apparatus.]

19. A [non-contact charging type] vehicle having an *antenna, an* electric motor and a storage battery serving as an electric power source for the electric motor, the storage battery being recharged using electric power transmitted from a charging [apparatus] *station* in a non-contact manner, *the vehicle comprising:*

*a coil configured to:*

[wherein the vehicle receives an area] *receive a transmitted area* ID assigned to a charging area of the charging [apparatus] *station* from the charging [apparatus] *station* as information used *for determining a charging area, in which the vehicle exists, transmitted* by the charging [apparatus] *station, wherein*

*the vehicle is configured to return, via the antenna, the transmitted area* [to determine a charging area, in which the vehicle exists, the vehicle including an in-vehicle communication device for returning the received area] ID to the charging [apparatus] *station; and*

*the coil configured to receive the electric power transmitted from the charging station in the non-contact matter*.

20. The [non-contact charging type] vehicle according to claim 19, wherein the [in-vehicle communication device is configured by] *coil functions as*:

a first [in-vehicle] communication device for near field use, the first [in-vehicle] communication device receiving the [area] *transmitted* ID through wireless communication; and

*the antenna functions as* a second [in-vehicle] communication device, wherein the second [-vehicle side] communication device returns the [area] *transmitted area* ID received by the first [in-vehicle] communication device to the charging [apparatus] *station*, and communicates electric power control information for recharging with the [charging apparatus] *vehicle* through wireless communication [for remote use different from the wireless communication for near field use], *and* the electric power control information [being] *is communicated* based on pairing, which is *a* communication connection [setting] between the vehicle and the charging [apparatus] *station* established by return of the [area] *transmitted area* ID.

[21. The non-contact charging type vehicle according to claim 19, wherein, when receiving the area ID, the in-vehicle communication device adds a vehicle ID, which is information specific to the vehicle, to the received area ID and returns the vehicle ID and the area ID to the charging apparatus.]

22. A [non-contact] charging [management apparatus] *station* for [managing] recharging [of] a storage battery mounted in a [charging target device] *vehicle having an antenna*, the recharging being performed through *a* non-contact transmission of electric power to the [charging target device through communication between] *vehicle from* the [non-contact] charging [management apparatus and the charging target device] *station*, the [non-contact] charging [management apparatus comprising] *station comprising*:

[an area ID assigning section for assigning an area ID to a charging area or each of a plurality of charging areas as information used by the non-contact charging management apparatus to determine a charging area, in which the charging target device exists;]

a [charging-side communication section for transmitting each of the area. IDs] *coil configured to:* transmit an area [assigned by the area] ID [assigning section] to the [charging target device] *vehicle*, [wherein, when the charging target device returns the transmitted area ID, the charging-side communication section receives the returned area ID; and an electric power transmitting section for identifying the charging area and the charging target device each as the electric power transmission target based on the area ID received by the charging-side communication section.] *the area ID being assigned to a charging area or ach of a plurality of charging areas as information used to determine a charging area in which the vehicle exists,*

*wherein the charging station is configured to receive the transmitted area ID from the vehicle via the antenna,*

*the charging station is configured to control the transmission of* the electric power [transmitting section transmitting electric power from the identified charging area] to the [identified charging target device in a] *vehicle in the* non-contact manner *based upon receipt of the transmitted area ID from the vehicle*.

23. The [non-contact] charging [management apparatus] *station* according to claim 22, wherein the [in-vehicle communicating section is configured by] *coil functions as*:

a first [charging-side] communication device for near field use, the first [charging-side] communication device transmitting the area ID to the [charging target device] *vehicle* through [the] *wireless* communication; and

*the antenna functions as* a second [charging-side] communication device, wherein the second [charging-side] communication device communicates electric power control information for the recharging with the [charging target device] *vehicle* through wireless communication [for remote use, which is different from wireless communication for near field use], and the electric power control information [being] *is communicated* based on pairing, which is *a* communication connection [setting] between the [charging side target device] *vehicle* and the [non-contact] charging [management apparatus] *station* established at [the] *a* time when the [charging target device] *vehicle* returns the area ID that has been transmitted by the first [charging-side] communication device.

24. The [non-contact] charging [management apparatus] *station* according to claim 22, wherein the [charging target device] *vehicle* is an electric vehicle or a hybrid vehicle including the storage battery serving as an electric power source for an electric motor[, and the area ID assigning section, the charging-side communication section, and the electric power transmitting section are mounted in a charging station for transmitting electric power to the electric vehicle or the hybrid vehicle].

[25. The non-contact charging management apparatus according to claim 22, the non-contact charging management apparatus being configured by:

a charging apparatus for transmitting the electric power; and a management center that has a management server and is network-connected to the charging apparatus, the management server generating the area ID each time when necessary or registering the area ID in a database in advance to manage the area ID, wherein the area ID assigning section and the charging-side communication section are mounted in the management server, the electric power transmitting section is arranged in the charging apparatus, and the charging-side communication section delivers the area ID either indirectly from the management center to the charging target device via the charging apparatus or directly from the management center to the charging target device.]

*26. The non-contact charging system according to claim 2, wherein*

*the charging station has a primary coil for electric power transmission,*

*the vehicle includes a secondary coil electromagnetically coupled to the primary coil, and*

*the electric power transmission, from the charging station to the vehicle, is carried out through electromagnetic induction or electromagnetic field resonance between the primary coil and the secondary coil, and*

*the charging device transmits the area ID to the vehicle using electromagnetic coupling between the primary coil and the secondary coil.*

*27. The non-contact charging system according to claim 2, wherein as the second communication through the intercommunication function, the electric power control is performed through wireless communication different from the near field communication between the paired vehicle and charging station.*

*28. The non-contact charging system according to claim 2, wherein*

*the charging station has a primary coil for electric power transmission,*

*the vehicle includes a secondary coil electromagnetically coupled to the primary coil, and*

*the electric power transmission, from the charging station to the vehicle, is carried out through electromagnetic induction or electromagnetic field resonance between the primary coil and the secondary coil, and*

*the charging station transmits the area ID to the vehicle without using the primary coil and the secondary coil.*

*29. The non-contact charging system according to claim 1, wherein the area ID is transmitted as a pairing signal.*

*30. The non-contact charging method according to claim 11, wherein*

*the charging station has a primary coil for electric power transmission,*

*the vehicle includes a secondary coil electromagnetically coupled to the primary coil, and*

*the electric power transmission, from the charging station to the vehicle, is carried out through electromagnetic induction or electromagnetic field resonance between the primary coil and the secondary coil, and*

*transmitting, from the charging apparatus, the area ID includes transmitting the area ID to the vehicle using electromagnetic coupling between the primary coil and the secondary coil.*

*31. The non-contact charging method according to claim 11, wherein performing, as the second communication through the intercommunication function, the electric power control includes performing the electric power control through wireless communication different from the near field communication between the paired vehicle and charging station.*

*32. The non-contact charging method according to claim 11, wherein*

*the charging station has a primary coil for electric power transmission,*

*the vehicle includes a secondary coil electromagnetically coupled to the primary coil, and*

*the electric power transmission, from the charging station to the vehicle, is carried out through electromagnetic induction or electromagnetic field resonance between the primary coil and the secondary coil, and*

*transmitting, from the charging station, the area ID includes transmitting the area ID to the vehicle without using the primary coil and the secondary coil.*

*33. The non-contact charging method according to claim 10, wherein the area ID is transmitted as a pairing signal.*

*34. The vehicle according to claim 19, wherein the vehicle is an electric vehicle or a hybrid vehicle including the storage battery serving as an electric power source for an electric motor.*

*35. A non-contact charging system comprising:*

*a vehicle having a storage battery; and*

*a charging station having an intercommunication function for intercommunicating with the vehicle, wherein*

*the non-contact charging system is configured to transmit electric power to the vehicle in a non-contact manner to recharge the storage battery,*

*the charging station is configured to transmit a code, including an area ID,*

*the vehicle is configured to return the transmitted code, and*

*the charging station is configured to control the transmission of the electric power to the vehicle based upon receipt of the transmitted code from the vehicle through the intercommunication function.*

*36. The non-contact charging system according to claim 35, wherein the code is transmitted as a pairing signal.*

* * * * *